United States Patent
Balachandran et al.

(10) Patent No.: US 10,757,565 B2
(45) Date of Patent: *Aug. 25, 2020

(54) METHOD AND APPARATUS FOR TRIGGERING OF SPECIFIC OPERATION MODE FOR TERMINALS OPERATING IN EXTENDED LONG RANGE

(71) Applicant: Telefonaktiebolaget L M Ericsson (publ), Stockholm (SE)

(72) Inventors: Kumar Balachandran, Pleasanton, CA (US); Johan Bergman, Stockholm (SE); Konstantinos Dimou, San Francisco, CA (US); Erik Eriksson, Linköping (SE); Anders Wallén, Ystad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,552

(22) Filed: Aug. 17, 2018

(65) Prior Publication Data

US 2018/0359631 A1    Dec. 13, 2018

Related U.S. Application Data

(63) Continuation of application No. 14/390,649, filed as application No. PCT/SE2013/051334 on Nov. 13, 2013, now Pat. No. 10,097,990.

(Continued)

(51) Int. Cl.
*H04W 8/22* (2009.01)
*H04W 52/50* (2009.01)
(Continued)

(52) U.S. Cl.
CPC ............ *H04W 8/22* (2013.01); *H04W 24/10* (2013.01); *H04W 52/50* (2013.01);
(Continued)

(58) Field of Classification Search
None
See application file for complete search history.

(56) References Cited

U.S. PATENT DOCUMENTS

| 6,751,444 B1 | 6/2004 | Meiyappan |
| 8,805,446 B2 | 8/2014 | Dominguez Romero et al. |

(Continued)

FOREIGN PATENT DOCUMENTS

| CN | 103650592 A | 3/2014 |
| EP | 1928134 A2 | 6/2008 |

(Continued)

OTHER PUBLICATIONS

Author Unknown, "Technical Specification Group Services and System Aspects; Service requirements for Machine-Type Communications (MTC); Stage 1 (Release 11)," Technical Specification 22.368, Version 11.6.0, 3GPP Organizational Partners, Sep. 2012, 21 pages.

(Continued)

*Primary Examiner* — Chi H Pham
*Assistant Examiner* — Raul Rivas
(74) *Attorney, Agent, or Firm* — Withrow & Terranova, PLLC

(57) ABSTRACT

Systems and methods are disclosed for triggering a long range extension mode of operation for a wireless device in a cellular communications network. In one preferred embodiment, the wireless device is a Machine Type Communication (MTC) device. In one embodiment, a node in the cellular communications network determines that the wireless device is to operate in the long range extension mode if (Continued)

there is difficulty in establishing communication between the wireless device and the cellular communications network. If the wireless device is to operate in the long range extension mode, the node activates one or more long range extension mechanisms with respect to the wireless device such that the wireless device operates in the long range extension mode. In this manner, the long range extension mode is selectively triggered for the wireless device.

13 Claims, 14 Drawing Sheets

Related U.S. Application Data

(60) Provisional application No. 61/725,951, filed on Nov. 13, 2012.

(51) Int. Cl.
| | |
|---|---|
| H04W 24/10 | (2009.01) |
| H04B 17/318 | (2015.01) |
| H04W 52/24 | (2009.01) |
| H04W 52/48 | (2009.01) |
| H04W 4/70 | (2018.01) |

(52) U.S. Cl.
CPC ............ *H04B 17/318* (2015.01); *H04W 4/70* (2018.02); *H04W 52/242* (2013.01); *H04W 52/245* (2013.01); *H04W 52/48* (2013.01)

(56) References Cited

U.S. PATENT DOCUMENTS

| | | | |
|---|---|---|---|
| 8,874,126 | B2 | 10/2014 | Jeong et al. |
| 2004/0052230 | A1 | 3/2004 | Soliman |
| 2004/0125776 | A1 | 7/2004 | Haugli et al. |
| 2007/0010256 | A1 | 1/2007 | Klabunde et al. |
| 2007/0286155 | A1 | 12/2007 | Kaikkonen et al. |
| 2009/0042582 | A1 | 2/2009 | Wang et al. |
| 2009/0207826 | A1 | 8/2009 | Bitran et al. |
| 2010/0304738 | A1 | 12/2010 | Lim |
| 2010/0329211 | A1 | 12/2010 | Ou |
| 2011/0021154 | A1 | 1/2011 | Marinier et al. |
| 2011/0201333 | A1 | 8/2011 | Kwon et al. |
| 2012/0063302 | A1 | 3/2012 | Damnjanovic et al. |
| 2012/0088498 | A1 | 4/2012 | Xiao et al. |
| 2012/0282934 | A1 | 11/2012 | Simonsson et al. |
| 2013/0102309 | A1 | 4/2013 | Chande et al. |
| 2013/0157680 | A1 | 6/2013 | Morita et al. |
| 2013/0223416 | A1 | 8/2013 | Michel |
| 2014/0050135 | A1 | 2/2014 | Zhang et al. |
| 2015/0078264 | A1 | 3/2015 | Han et al. |
| 2015/0092566 | A1 | 4/2015 | Balachandran et al. |
| 2015/0117233 | A1 | 4/2015 | Wong et al. |
| 2015/0271763 | A1 | 9/2015 | Balachandran et al. |
| 2016/0316491 | A1 | 10/2016 | Axmon et al. |

FOREIGN PATENT DOCUMENTS

| | | |
|---|---|---|
| RU | 2358396 C2 | 6/2009 |
| WO | 2012093888 A2 | 7/2012 |
| WO | 2012173565 A1 | 12/2012 |
| WO | 2014077765 A1 | 5/2014 |
| WO | 2015012654 A1 | 1/2015 |
| WO | 2015116732 A1 | 8/2015 |

OTHER PUBLICATIONS

Author Unknown, "Technical Specification Group Radio Access Network; Radio Resource Control (RRC); Protocol Specification (Release 12)," Technical Specification 25.331, Version 12.5.0, 3GPP Organizational Partners, Mar. 2015, 2225 pages.
Author Unknown, "Technical Specification Group Radio Access Network; Evolved Universal Terrestrial Radio Access (E-UTRA); Requirements for support of radio resource management (Release 12)," Technical Specification 36.133, Version 12.4.0, 3GPP Organizational Partners, Jul. 2014, 870 pages.
Author Unknown, "Technical Specification Group Radio Access Network; Evolved Universal Terrestrial Radio Access (E-UTRA); Requirements for support of radio resource management (Release 8)," Technical Specification 36.133, Version 8.19.0, 3GPP Organizational Partners, Sep. 2012, 338 pages.
Author Unknown, "Technical Specification Group Radio Access Network; Evolved Universal Terrestrial Radio Access (E-UTRA); Physical layer procedures (Release 8)," Technical Specification 36.213, Version 8.8.0, 3GPP Organizational Partners, Sep. 2009, 77 pages.
Author Unknown, Technical Specification Group Radio Access Network; Evolved Universal Terrestrial Radio Access (E-UTRA); Radio Resource Control (RRC); Protocol specification (Release 8), Technical Specification 36.331, Version 8.17.0, 3GPP Organizational Partners, Jun. 2012, 215 pages.
Author Unknown, "Technical Specification Group Radio Access Network; Study on provision of low-cost MTC UEs based on LTE; (Release 11)," Technical Report 36.888, Version 2.0.0, 3GPP Organizational Partners, Jun. 2012, 43 pages.
Ericsson, "Tdoc R2-150456: Random access procedure for low complexity and coverage enhanced UEs," 3rd Generation Partnership Project (3GPP), TSG-RAN WG2 #89, Feb. 9-13, 2015, 7 pages, Athens, Greece.
Ericsson et al., "R1-124887: General considerations on coverage enhancements for MTC," 3rd Generation Partnership Project (3GPP), TSG-RAN WG1 #71, Nov. 12-16, 2012, 6 pages, New Orleans, USA.
Ericsson et al., "R1-124888: Required functionality for coverage enhancements for MTC," 3rd Generation Partnership Project (3GPP), TSG-RAN WG1 #71, Nov. 12-16, 2012, 4 pages, New Orleans, USA.
Ericsson, "R4-151491: Impact on RACH in enhanced coverage for MTC," 3rd Generation Partnership Project (3GPP), TSG RAN WG4 Meeting #74bis, Apr. 20-24, 2015, 4 pages, Rio de Janeiro, Brazil.
Etri, "R1-150520: Feedback enhancements for high-order MU-MIMO," 3rd Generation Partnership Project (3GPP), TSG RAN WG1 Meeting #80, Feb. 9-13, 2015, 7 pages, Athens, Greece.
Huawei, et al., "R1-140026: Considerations on PRACH repetition levels and power adjustment of PRACH," 3rd Generation Partnership Project (3GPP), TSG RAN WG1 Meeting #76, Feb. 10-14, 2014, 6 pages, Prague, Czech Republic.
NEC, "R2-151420: RAR for Rel-13 low-complexity UE and UE in enhanced coverage," 3rd Generation Partnership Project (3GPP), TSG RAN2 Meeting #89bis, Apr. 20-24, 2015, 3 pages, Bratislava, Slovakia.
RAN1, "R1-150920: LS on PRACH coverage enhancement," 3rd Generation Partnership Project (3GPP), TSG RAN WG1 Meeting #80, Feb. 9-13, 2015, 2 pages, Athens, Greece.
RAN1, "R2-151008: LS on PRACH coverage enhancement," 3rd Generation Partnership Project (3GPP), TSG RAN WG2 Meeting #89bis, Apr. 20-24, 2015, 1 page, Bratislava, Slovakia.
SHARP, "R2-150148: Consideration on coverage enhanced RACH for Rel-13 MTC UEs," 3rd Generation Partnership Project (3GPP), TSG RAN WG2 Meeting #89, Feb. 9-13, 2015, 4 pages, Athens, Greece.
VODAFONE, "RP-121441: Updated SID on: Provision of low-cost MTC UEs based on LTE," 3rd Generation Partnership Project (3GPP), TSG RAN Meeting #57, Sep. 4-7, 2012, 6 pages, Chicago.
Non-Final Office Action for U.S. Appl. No. 14/390,649, dated Jul. 15, 2016, 21 pages.
Final Office Action for U.S. Appl. No. 14/390,649, dated Dec. 16, 2016, 8 pages.
Advisory Action and Examiner-Initiated Interview Summary for U.S. Appl. No. 14/390,649, dated Apr. 10, 2017, 4 pages.
Non-Final Office Action for U.S. Appl. No. 14/390,649, dated Jul. 26, 2017, 22 pages.
Notice of Allowance for U.S. Appl. No. 14/390,649, dated Feb. 8, 2018, 7 pages.

(56) References Cited

OTHER PUBLICATIONS

Notice of Allowance for U.S. Appl. No. 14/390,649, dated May 18, 2018, 8 pages.
Non-Final Office Action for U.S. Appl. No. 15/134,861, dated Apr. 11, 2018, 6 pages.
Notice of Allowance for U.S. Appl. No. 15/134,861, dated Jul. 13, 2018, 9 pages.
Non-Final Office Action for U.S. Appl. No. 14/441,479, dated Oct. 7, 2016, 27 pages.
Final Office Action for U.S. Appl. No. 14/441,479, dated Apr. 18, 2017, 29 pages.
Non-Final Office Action for U.S. Appl. No. 14/441,479, dated Oct. 6, 2017, 26 pages.
Extended European Search Report for European Patent Application No. 17164602.9, dated Jul. 25, 2017, 9 pages.
International Search Report and Written Opinion for PCT/SE2013/051335, dated Feb. 12, 2014, 10 pages.
Substantive Examination for Russian Patent Application No. 2015122640/07, dated May 5, 2016, 12 pages.
International Search Report for PCT/SE2013/051334, dated Apr. 24, 2014, 3 pages.
International Preliminary Report on Patentability for International Patent Application No. PCT/SE2013/051334, dated May 28, 2015, 7 pages.
The First Office Action for Chinese Patent Application No. 201680024790.4, dated Aug. 3, 2018, 29 pages.
International Search Report and Written Opinion for PCT/EP2016/059218, dated Jul. 18, 2016, 15 pages.
International Preliminary Report on Patentability for International Patent Application No. PCT/EP2016/059218, dated Nov. 9, 2017, 10 pages.
Final Office Action for U.S. Appl. No. 14/441,479, dated May 11, 2018, 25 pages.
Advisory Action and Examiner-Initiated Interview Summary for U.S. Appl. No. 14/441,479, dated Aug. 7, 2018, 5 pages.
Notice of Allowance and Examiner-Initiated Interview Summary for U.S. Appl. No. 14/441,479, dated Sep. 5, 2018, 15 pages.
Examination Report for European Patent Application No. 13802130.8, dated Apr. 11, 2019, 4 pages.

METHOD AND APPARATUS FOR TRIGGERING OF SPECIFIC OPERATION MODE FOR TERMINALS OPERATING IN EXTENDED LONG RANGE

RELATED APPLICATIONS

This application is a continuation of patent application Ser. No. 14/390,649, filed Oct. 3, 2014, now U.S. Pat. No. 10,097,990 which is a 35 U.S.C. § 371 national phase filing of International Application No. PCT/SE2013/051334, filed Nov. 13, 2013, which claims the benefit of provisional patent application Ser. No. 61/725,951, filed Nov. 13, 2012, the disclosures of which are hereby incorporated herein by reference in their entireties.

FIELD OF THE DISCLOSURE

The present disclosure relates to a cellular communications network and more particularly relates to triggering a long range extension mode of operation for a wireless device operating in the cellular communications network.

BACKGROUND

There is an increasing need to support efficient and cost-effective devices or terminals in a cellular communications network. This is especially true with respect to the development of Machine-to-Machine (M2M) communications, which is currently receiving an increasing amount of attention and development. Unlike traditional services, such as voice and web streaming, M2M services often have very different requirements on the cellular communications network. This is due, at least in part, to the specific features of M2M services such as those specified in the 3rd Generation Partnership Project (3GPP) Technical Specification (TS) 22.368 V11.6.0, "Service requirements for Machine-Type Communications (MTC); Stage 1." Another characteristic that distinguishes cellular communications networks with M2M communications is the large increase in the number of Machine Type Communication (MTC) devices. Both the different requirements of M2M services and the large number of MTC devices present new challenges to develop cost-efficient, spectrum-efficient, and energy-efficient radio access technologies for M2M applications and MTC devices in a cellular communications network.

In M2M communications, the MTC devices (e.g., smart meters, signboards, cameras, remote sensors, laptops, and appliances) are connected to the cellular communications network. Most of the MTC devices sporadically transmit one or only a few short packets containing measurements, reports, and triggers, e.g., temperature, humidity, wind speed, etc. In most cases, the MTC devices are expected to be static or to have low mobility. A common understanding of MTC devices is that the MTC devices should be of low complexity targeting low-end (low average revenue per user, low data rate, high latency tolerance) applications. The power/energy consumption of the MTC devices is expected to be low as well.

Several factors affect the cost for both manufacturing and operating a given wireless device. The main manufacturing cost drivers are: (1) processing speed (mainly at reception), (2) number of antennas, and (3) bandwidth. Therefore, 3GPP Radio Access Network (RAN) Work Group 1 (i.e., RAN1) has studied Long Term Evolution (LTE) User Equipment (UE) modem cost reduction techniques for provisioning of low-cost MTC UEs based on LTE. The results of the study are documented in 3GPP Technical Report (TR) 36.888 V2.0.0 (3GPP Tdoc RP-120714), "Study on provision of low-cost Machine-Type Communications (MTC) User Equipments (UEs) based on LTE." Since then, an updated Study Item Description (SID) (3GPP Tdoc RP-121441, "Study on Provision of low-cost MTC UEs based on LTE") has been approved which extends the scope of the study to also include study of coverage enhancements. More specifically, the updated SID states that:

A 20 dB improvement in coverage in comparison to defined LTE cell coverage footprint engineered for "normal LTE UEs" should be targeted for low-cost MTC UEs, using very low rate traffic with relaxed latency (e.g. size of the order of 100 bytes/message in UL and 20 bytes/message in DL, and allowing latency of up to 10 seconds for DL and up to 1 hour in uplink, i.e. not voice). In identifying solutions, any other related work agreed for Release 12 should be taken into account.

This new requirement on enhanced coverage for very low rate traffic with relaxed latency in accordance with the updated SID should be added to the list of requirements on the low-cost MTC UE specified in 3GPP TR 36.888 section 5.1, which are:

Support data rates equivalent to that supported by R'99 Enhanced General Packet Radio Service (EGPRS) with an EGPRS multi-slot class 2 device (2 downlink timeslots (118.4 Kilobits per second (Kbps)), 1 uplink timeslot (59.2 Kbps), and a maximum of 3 active timeslots) as a minimum. This does not preclude the support of higher data rates provided the cost targets are not compromised.

Enable significantly improved average spectrum efficiency for low data rate MTC traffic compared to that achieved for R99 Global System for Mobile Communications (GSM)/EGPRS terminals in GSM/EGPRS networks today, and ideally comparable with that of LTE. Optimizations for low-cost MTC UEs should minimize impact on the spectrum efficiency achievable for other terminals (normal LTE terminals) in LTE Release 8-10 networks.

Ensure that service coverage footprint of low cost MTC UE based on LTE is not any worse than the service coverage footprint of GSM/EGPRS MTC device (in an GSM/EGPRS network) or that of "normal LTE UEs" (in an LTE network) assuming on the same spectrum band.

Ensure that overall power consumption is no worse than existing GSM/General Packet Radio Service (GPRS) based MTC devices.

Ensure good radio frequency coexistence with legacy (Release 8-10) LTE radio interface and networks.

Target operation of low-cost MTC UEs and legacy LTE UEs on the same carrier.

Re-use the existing LTE/System Architecture Evolution (SAE) network architecture.

Solutions should be specified in terms of changes to the Release 10 version of the LTE specifications.

The study item shall consider optimizations for both Frequency Division Duplexing (FDD) and Time Division Duplexing (TDD) mode.

The initial phase of the study shall focus on solutions that do not necessarily require changes to the LTE base station hardware.

Low cost MTC device support limited mobility (i.e., no support of seamless handover or ability to operate in networks in different countries) and are low power consumption modules.

Thus, systems and methods for not only meeting the aforementioned requirements for MTC communication and MTC devices but also for optimizing MTC communication and the operation of MTC devices are desired.

SUMMARY

Systems and methods are disclosed for triggering a long range extension mode of operation for a wireless device in a cellular communications network. In one preferred embodiment, the wireless device is a Machine Type Communication (MTC) device. In one embodiment, a node in the cellular communications network determines that the wireless device is to operate in the long range extension mode if there is difficulty in establishing communication between the wireless device and the cellular communications network. If the wireless device is to operate in the long range extension mode, the node activates one or more long range extension mechanisms with respect to the wireless device such that the wireless device operates in the long range extension mode. In this manner, the long range extension mode is selectively triggered for the wireless device. By selectively triggering the long range extension mode for wireless devices in the cellular communications network in this manner, performance is improved. In one embodiment, the node is the wireless device. In another embodiment, the node is a network node such as, for example, a base station.

In one embodiment, the node determines that there is difficulty in establishing communication between the wireless device and the cellular communications network if there is difficulty in establishing a downlink from the cellular communications network to the wireless device. In another embodiment, the node determines that there is difficulty in establishing communication between the wireless device and the cellular communications network if there is difficulty in establishing an uplink from the wireless device to the cellular communications network. In yet another embodiment, the node determines that there is difficulty in establishing communication between the wireless device and the cellular communications network if there is difficulty in establishing both a downlink from the cellular communications network to the wireless device and an uplink from the wireless device to the cellular communications network.

In one embodiment, the one or more long range extension mechanisms include one or more long range extension mechanisms for an uplink from the wireless device to the cellular communications network. In another embodiment, the one or more long range extension mechanisms include one or more long range extension mechanisms for a downlink from the cellular communications network to the wireless device. In yet another embodiment, the one or more long range extension mechanisms include one or more long range extension mechanisms for both an uplink from the wireless device to the cellular communications network and a downlink from the cellular communications network to the wireless device.

In one embodiment, the node determines that there is difficulty in establishing communication between the wireless device and the cellular communications network when one or more parameters indicative of the difficulty in establishing communication between the wireless device and the cellular communications network are worse than one or more corresponding predefined thresholds.

In one embodiment, the node determines that there is difficulty in establishing communication between the wireless device and the cellular communications network when communication between the wireless device and the cellular communications network is not possible in a normal mode of operation.

In another embodiment, the node determines that there is difficulty in establishing communication between the wireless device and the cellular communications network when communication between the wireless device and the cellular communications network is not possible in a normal mode of operation and a received strength of signal with respect to the wireless device is less than or equal to a predefined threshold received strength of signal.

In another embodiment, the node determines that there is difficulty in establishing communication between the wireless device and the cellular communications network when Reference Signal Received Power (RSRP) measurements for a number, N, of strongest cells made by the wireless device are each less than a predefined threshold RSRP.

In another embodiment, the node determines that there is difficulty in establishing communication between the wireless device and the cellular communications network when a number of unsuccessful random access attempts by the wireless device is greater than a predefined threshold number of random access attempts.

In another embodiment, the node determines that there is difficulty in establishing communication between the wireless device and the cellular communications network when an amount of time that has elapsed since a time at which the wireless device transmitted a last scheduling request without receiving a grant of the scheduling request exceeds a predefined threshold scheduling request delay.

In another embodiment, the node is a network node, and the network node determines that there is difficulty in establishing communication between the wireless device and the cellular communications network when no response is received from the wireless device after the network node has sent a predefined number of uplink scheduling grants to the wireless device.

In another embodiment, the node is a network node, and the network node determines that there is difficulty in establishing communication between the wireless device and the cellular communications network when no response is received from the wireless device after the network node has sent a predefined number of paging requests to the wireless device.

In another embodiment, the node is a network node, and the network node determines that there is difficulty in establishing communication between the wireless device and the cellular communications network when a received strength of signal for an uplink from the wireless device to the network node is less than a predefined uplink received strength of signal.

In one embodiment, the node is the wireless device, and, if the wireless device is to operate in the long range extension mode, the wireless device attempts a random access using one or more resources dedicated for the long range extension mode of operation. In another embodiment, the node is the wireless device, and, if the wireless device is to operate in the long range extension mode, the wireless device attempts a scheduling request transmission using one or more resources dedicated for the long range extension mode of operation.

In one embodiment, the node is a network node and, in order to activate the one or more long range extension mechanisms, the network node is configured to signal information to the wireless device that is indicative of one or more radio resources dedicated for random access attempts in the long range extension mode of operation, one or more radio resources dedicated for uplink scheduling requests in the long range extension mode of operation, or both.

In one embodiment, the node is the wireless device. The wireless device is configured to receive information that is indicative of one or more radio resources dedicated for random access attempts in the long range extension mode of operation, one or more radio resources dedicated for uplink scheduling requests in the long range extension mode of operation, or both. In order to activate the one or more long range extension mechanisms, the wireless device is further configured to activate use of the one or more radio resources dedicated for random access attempts in the long range extension mode of operation, the one or more radio resources dedicated for uplink scheduling requests in the long range extension mode of operation, or both.

In one embodiment, the node is a network node, and, in order to activate the one or more long range extension mechanisms, the network node is further configured to transmit a request to the wireless device for the wireless device to operate in the long range extension mode of operation.

In one embodiment, the node is the wireless device, and the wireless device is further configured to determine that there is difficulty in establishing communication between the wireless device and the cellular communications network when the wireless device is stationary and within a coverage hole within a coverage area of the cellular communications network.

In one embodiment, the node is the wireless device, and the wireless device is further configured to de-activate the one or more long range extension mode mechanisms in response to signaling from a network node of the cellular communications network that forces the wireless device out of the long range extension mode of operation and into a normal mode of operation.

In one embodiment, the node is a network node, and the network node is further configured to subsequently force the wireless device to de-activate the one or more long range extension mode mechanisms such that the wireless device enters a normal mode of operation.

In another embodiment, the node is further configured to select one or more parameters for the long range extension mode of operation as a function of a difficulty level in establishing communication between the cellular communications network and the wireless device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
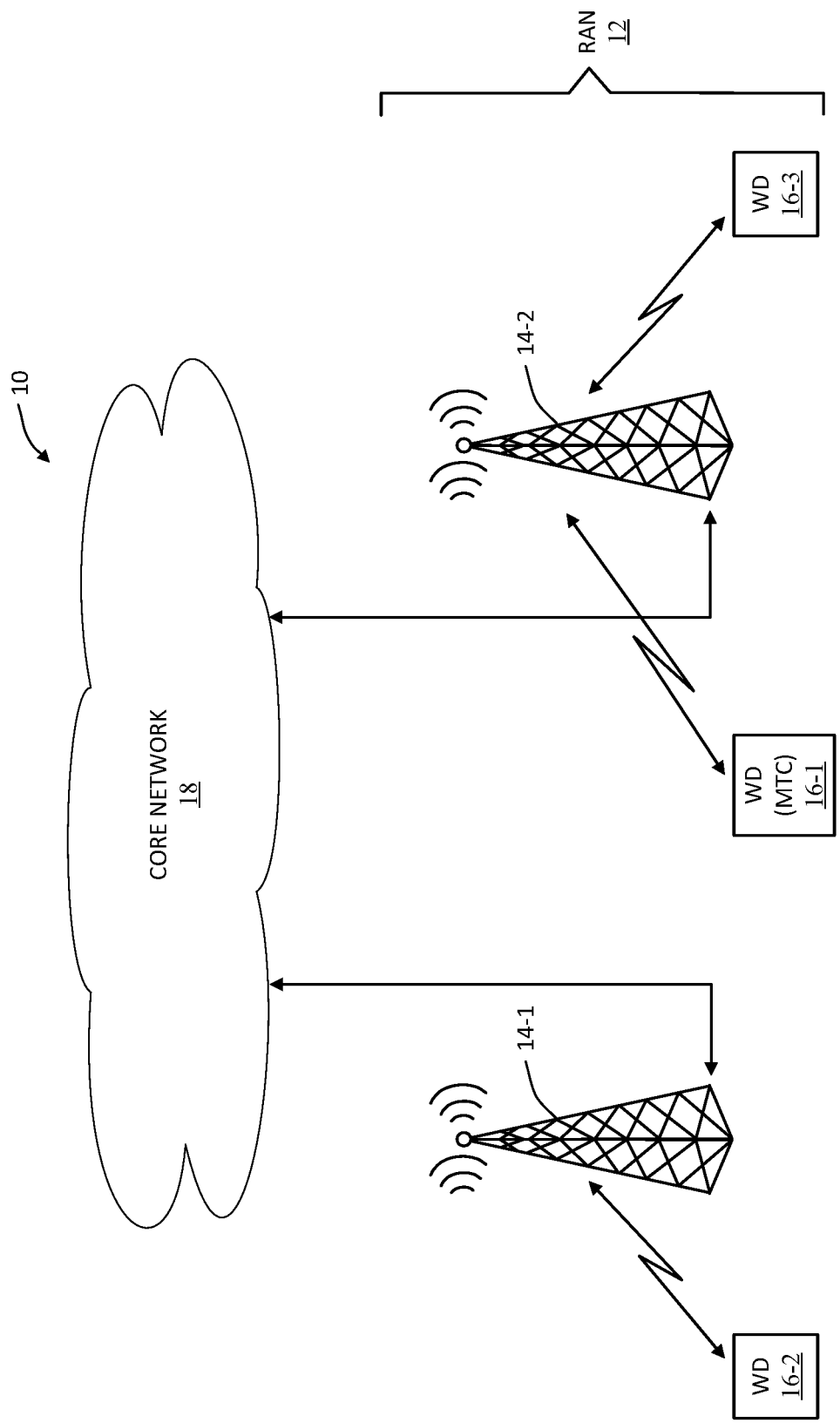
FIG. 1 illustrates a cellular communications network according to one embodiment of the present disclosure.
Figure 14:
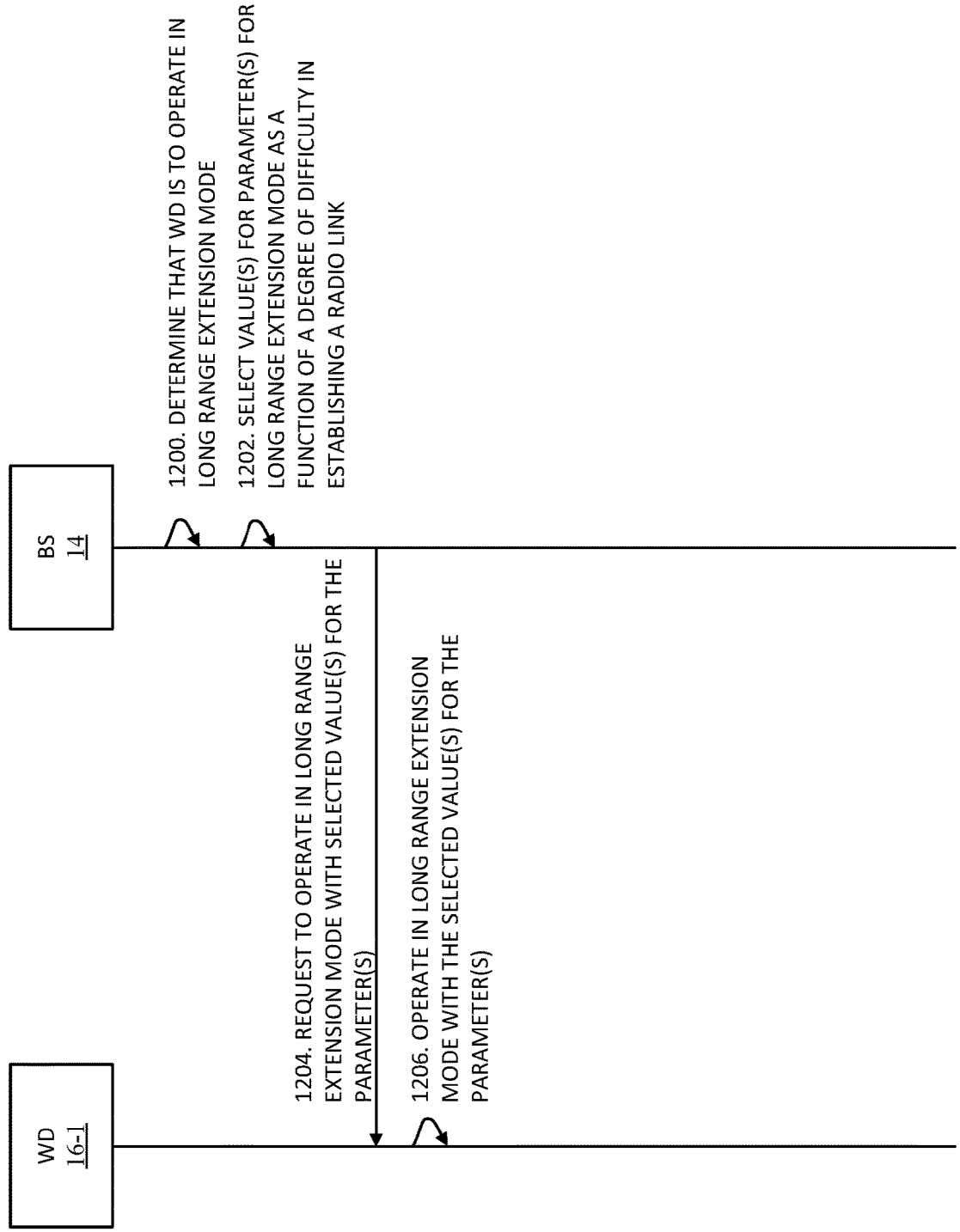
Figure 15:
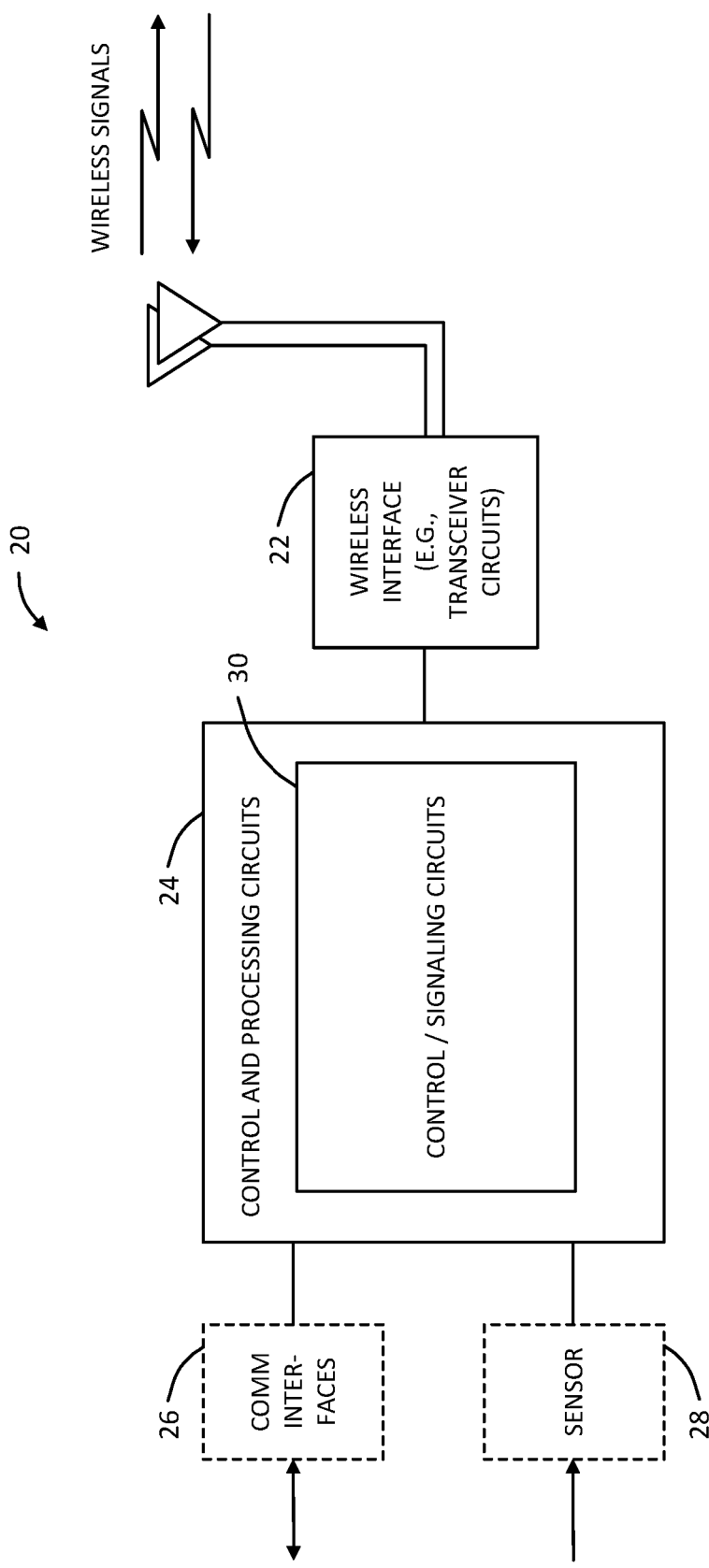

FIG. 14 illustrates the operation of the cellular communications network of FIG. 1 according to one embodiment in which a base station selects value(s) for one or more parameter(s) for the long range extension mode of operation of a wireless device according to one embodiment of the present disclosure; and FIG. 15 is a block diagram of a node (e.g., a wireless device or a base station) in the cellular communications network of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for triggering a long range extension mode of operation for a wireless device in a cellular communications network. The wireless device is preferably a Machine Type Communication (MTC) device, but may alternatively be any wireless device in the cellular communications network capable of operating in the long range extension mode of operation. In one embodiment, a node in the cellular communications network determines whether the wireless device is to operate in the long range extension mode or a normal mode. If the wireless device is to operate in the long range extension mode, the node activates one or more long range extension mechanisms with respect to the wireless device such that the wireless device operates in the long range extension mode. In this manner, the long range extension mode is selectively triggered for the wireless device.

By selectively triggering the long range extension mode for wireless devices in the cellular communications network in this manner, performance is improved. More specifically, wireless devices operating according to existing cellular communications standards (e.g., existing Long Term Evolution (LTE) standards) reach a practical limit with respect to the maximum acceptable propagation loss while still maintaining corresponding radio links between the wireless devices and the cellular communications network (particularly the Radio Access Network (RAN) of the cellular communications network). One or more long range extension mechanisms may be used to increase this maximum path loss. However, these long range extension mechanisms may come at a cost in terms of a loss in other performance metrics such as, for example, increased radio resources needed, decreased maximum throughput, increased energy consumption, and decreased system spectral efficiency. These losses may be acceptable in order to serve the wireless devices that experience high propagation loss but may result in unnecessary losses in other performance metrics for wireless devices that do not experience high propagation loss. Embodiments of the systems and methods disclosed herein can be utilized to selectively trigger the long range extension mode only for those wireless devices that experience high propagation loss (i.e., only for those wireless devices that need it). In this manner, wireless devices that do not suffer from high propagation loss do not suffer from performance losses associated with the long range extension mechanisms.

In this regard, FIG. 1 illustrates a cellular communications network 10 according to one embodiment of the present disclosure. Notably, in many of the embodiments described herein, the cellular communications network 10 is a LTE (i.e., LTE or LTE-Advanced) cellular communications network. As such, LTE terminology is oftentimes used throughout this disclosure. However, the concepts and embodiments disclosed herein are not limited to LTE and may be utilized in any suitable type of cellular or wireless network.

As illustrated, the cellular communications network 10 includes a RAN 12 including a number of base stations 14-1 and 14-2 (generally referred to herein collectively as base stations 14 and individually as base station 14). The base stations 14 provide wireless access to wireless devices 16-1 through 16-3 (generally referred to herein collectively as wireless devices 16 and individually as wireless device 16) within coverage areas (e.g., cells) of the base stations 14. The base stations 14 are connected to a core network 18. Note that while only two base stations 14 and three wireless devices 16 are illustrated in this example for clarity and ease of discussion, the cellular communications network 10 may include many base stations 14 serving many wireless devices 16. In LTE terminology, the wireless devices 16 are referred to as User Equipments (UEs), and the base stations 14 are referred to as Evolved, or Enhanced, Node Bs (eNBs). While in this embodiment the base stations 14 are macro base stations, the RAN 12 may include a mixture of macro base stations and lower power base stations (i.e., pico base stations, femto base stations, Home eNBs, etc.). At least some of the wireless devices 16 are MTC devices that perform Machine-to-Machine (M2M) communication. Some examples of MTC devices are smart meters, signboards, cameras, remote sensors, laptops, and appliances. In this example, the wireless device 16-1 is an MTC device.

The wireless devices 16, or at least the wireless devices 16 that are capable of M2M communication (i.e., the MTC devices), are configured to operate in either a normal mode of operation or a long range extension mode of operation. In one embodiment, the normal mode and the long range extension mode are two different modes (i.e., a first mode and a second mode), where, in the long range extension mode, the wireless device 16 is configured to maintain communication (i.e., uplink and/or downlink) with the cellular communications network 10 (via one of the base stations 14) over an extended range as compared to that in the normal mode. This extended range is a range beyond which communication between the wireless device 16 and a corresponding base station 14 would normally be difficult or impossible. In one embodiment, a wireless device 16 operates in the long range extension mode when a radio propagation path between the wireless device 16 and a nearest base station 14 (in terms radio distance, e.g., highest received signal strength, highest Reference Signal Received Power (RSRP), highest Reference Signal Received Quality (RSRQ), or the like) is worse than a predefined threshold degree. In one particular embodiment, a wireless device 16 operates in the long range extension mode when a path loss for a propagation path between the wireless device 16 and a nearest base station 14 (in terms radio distance, e.g., highest received signal strength, highest RSRP, highest RSRQ, or the like) exceeds the typical path loss value of N Decibels (dB) in the cellular communications network 10 for a typical inter-site distance in the order of hundreds of meters.

In order to enable the long range extension mode of operation, one or more long range extension mechanisms are utilized by the cellular communications network 10 (e.g., by the base stations 14) and/or the wireless devices 16 that are capable of operating in the long range extension mode (e.g., those wireless devices 16 that are MTC devices or are capable of M2M communication). If a wireless device 16 is configured to operate in the long range extension mode (specific to that wireless device 16), at least one of the one or more long range extension mechanisms are activated with respect to the wireless device 16. Otherwise, if the wireless device 16 is configured to operate in the normal mode of operation and the long range extension mechanisms are deactivated. The one or more long range extension mechanisms increase a maximum acceptable propagation loss while still maintaining the radio link (uplink and/or downlink) between the wireless device 16 and the cellular communications network 10 (specifically the RAN 12), which thereby enables communication within a long range extension of the RAN 12. The long range extension mechanisms that are utilized to provide the long range extension mode include, e.g., increased transmit power at the wireless device 16 and/or the base station(s) 14 (e.g., the nearest base station 14), increased amount of reference signal resources in the uplink and/or downlink, modified repetition schemes in the uplink and/or downlink, scheduling restrictions in the uplink and/or downlink, different coding and modulation schemes in the uplink and/or downlink, synchronization signals that are more likely to be detected by the wireless device 16 when operating in the long range extension mode, use of random access resources that improve probability of being detected by the RAN 12, or the like, or any combination thereof.

Figure 2:
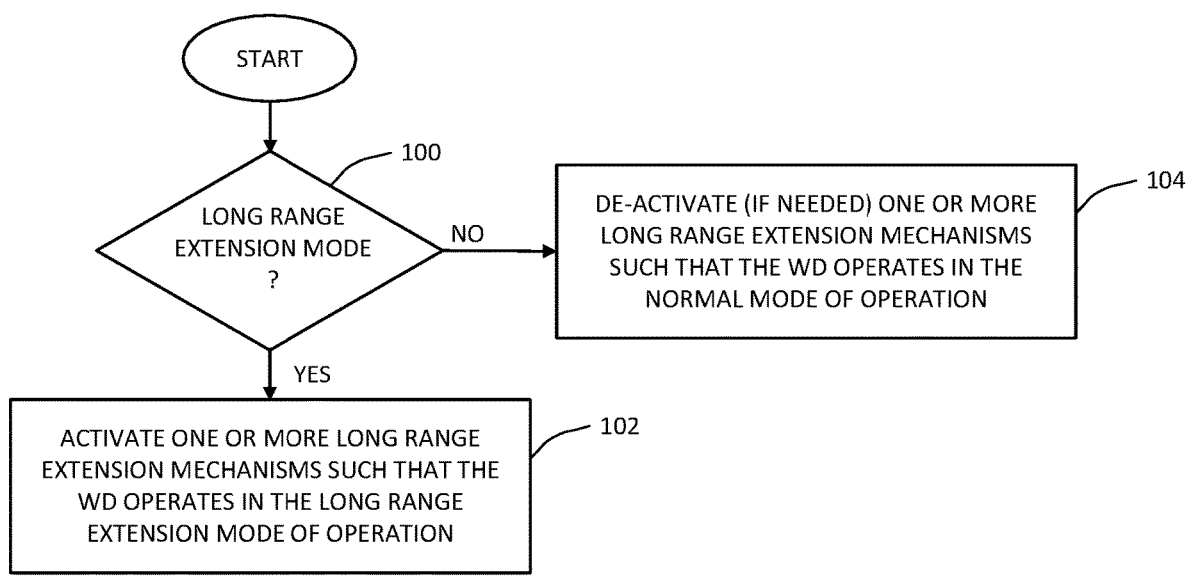
FIG. 2 illustrates a process by which a node in the cellular communications network of FIG. 1 selectively triggers a long range extension mode for a wireless device according to one embodiment of the present disclosure.

As discussed below, the long range extension mode is selectively triggered, or activated, for the wireless devices 16 (e.g., the wireless device 16-1) that are capable of being configured in the long range extension mode or the normal mode. In this regard, FIG. 2 illustrates a process by which a node in the cellular communications network 10 selectively triggers the long range extension mode for, in this example, the wireless device 16-1 according to one embodiment of the present disclosure. The node may be either the wireless device 16-1 or a network node. As used herein, a "network node" is a node within the RAN 12 or the core network 18. Further, a "radio network node" is a network node in the RAN 12 (e.g., one of the base stations 14 or some other node in the RAN 12 such as, for example, a relay). A "core network node" is a network node in the core network 18 (e.g., a Mobility Management Entity (MME)).

First, the node determines whether the wireless device 16-1 is to be in the long range extension mode or the normal mode (step 100). Embodiments of how the node makes the determination in step 100 are discussed below. However, the determination is not limited to the embodiments discussed below. As one example, in one or more embodiments, the decision on whether the wireless device 16-1 is to operate in the long range extension mode or the normal mode is made based on an extent to which communication between the wireless device 16-1 and the RAN 12 (in the downlink, uplink, or both) proves to be difficult. Some examples of the conditions, parameters, and thresholds that are indicative of the degree of difficulty, or difficultly level, of maintaining communication are described below.

If the node determines that the wireless device 16-1 is to operate in the long range extension mode, the node activates one or more long range extension mechanisms with respect to the wireless device 16-1 such that the wireless device 16-1 operates in the long range extension mode (step 102). As discussed below, in some embodiments, the long range extension mechanisms activated include: increased transmit power at the wireless device 16-1 and/or the corresponding or nearest base station 14 (e.g., the serving base station 14 of the wireless device 16-1), increased amount of reference signal resources in the uplink and/or downlink, modified repetition schemes in the uplink and/or downlink, scheduling restrictions in the uplink and/or downlink, different coding and modulation schemes in the uplink and/or downlink, synchronization signals that are more likely to be detected by the wireless device 16-1 when operating in the long range extension mode, use of random access resources that improve probability of being detected by the RAN 12, or the like, or any combination thereof. Note that these long range extension mechanisms are just some examples. Other long range extension mechanisms may additionally or alternatively be used. Returning to step 100, if the node determines that the wireless device 16-1 is not to operate in the long range extension mode (i.e., is to operate in the normal mode), the node, if needed, de-activates the one or more long range extension mechanisms with respect to the wireless device 16-1 such that the wireless device 16-1 operates in the normal mode (step 104). Using this process, the node selectively activates/de-activates the long range extension mode of operation for the wireless device 16-1.

Figure 3:
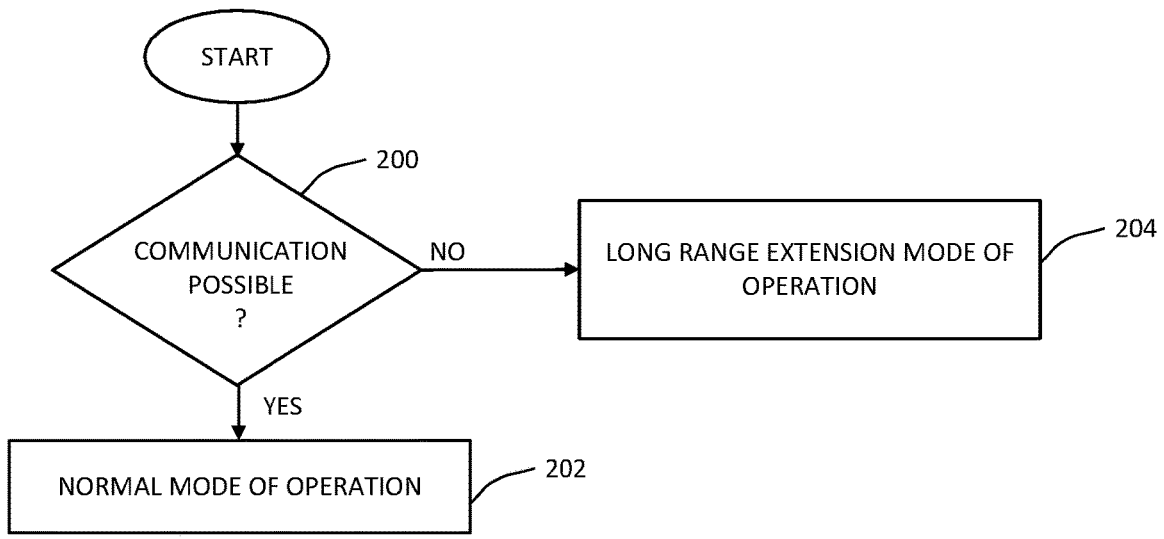
FIG. 3 illustrates a process by which a node in the cellular communications network of FIG. 1 decides whether a wireless device is to be in the long range extension mode or a normal mode according to one embodiment of the present disclosure.

FIG. 3 illustrates a process by which a node determines whether, in this example, the wireless device 16-1 is to operate in the long range extension mode or the normal mode according to one embodiment of the present disclosure. While not being limited thereto, the process of FIG. 3 may, in one embodiment, be utilized for step 100 of FIG. 2. Again, the node that performs the process of FIG. 3 may be the wireless device 16-1 or a network node (e.g., the serving base station 14 of the wireless device 16-1). First, the node determines whether communication (e.g., uplink and/or downlink) between the wireless device 16-1 and the cellular communications network 10 is possible (step 200). Note that determining whether communication is possible need not be accomplished as a special step. Rather, such a determination may be made by the node whenever the wireless device 16-1 has to communicate with a base station 14, or vice versa, for any reason. The determination as to whether communication is possible may be based on, for example, whether such communication satisfies a required Quality of Service (QoS) target. In other words, communication is determined to be possible if the required QoS target is met, and communication is determined to not be possible if the required QoS target is not met. The QoS target may include, for example, one or more of:

a minimum RSRP threshold such that the QoS target is not met if RSRP is below the minimum RSRP threshold, a minimum RSRQ threshold such that the QoS target is not met if RSRQ is below the minimum RSRQ threshold, a minimum Channel Quality Indication (CQI) threshold such that the QoS target is not met if CQI is below the minimum CQI threshold, an Uplink (UL) Sounding Reference Signals received power threshold such that the QoS target is not met if UL Sounding Reference Signals are below a threshold, an UL Signal-to-Interference-Plus-Noise Ratio (SINR) threshold such that the QoS target is not met if UL SINR is below the UL SINR threshold, a Downlink (DL) SINR threshold such that the QoS target is not met if DL SINR is below the DL SINR threshold, a synchronization time window such that the QoS target is not met if synchronization to the Primary Synchronization Sequence Signal (PSS), synchronization to the Secondary Synchronization Sequence Signal (SSS), and/or cell Identifier (ID) acquisition is not done within an amount of time defined by the synchronization time window, a non-successful paging attempts threshold such that the QoS target is not met if (from the cellular communications network 10 side) a number, N, of non-successful paging attempts for the wireless device 16-1 exceeds the non-successful paging attempts threshold, a non-successful random access attempts threshold such that the QoS target is not met (from the wireless device 16-1 side) if a number, K, of non-successful random access attempts by the wireless device 16-1 exceeds the non-successful random access attempts threshold, a Bit Error Rate (BER) threshold such that the QoS target is not met if BER is above the BER threshold, a Block Error Rate (BLER) threshold such that the QoS target is not met if BLER is above the BLER threshold, an Internet Protocol (IP) packet delay threshold such that the QoS target is not met if IP packet delay is above the IP packet delay threshold, and IP packet loss threshold such that the QoS target is not met if IP packet loss is above the IP packet loss threshold.

Note that the thresholds for the QoS target may be static (e.g., standardized) or be configurable by the cellular communications network 10.

Also, in addition to the criteria given above for the QoS target, the QoS target may further include a target packet delay and a target error packet loss for a corresponding QoS class. More specifically, the LTE standards define a number of QoS classes each having a corresponding required QoS target specified in terms of a target packet delay and a target error packet loss (e.g., QoS Class 9 has a priority level of 9, a required maximum packet delay of 300 milliseconds (ms), and a required maximum packet error loss rate of $10^{-6}$ packets (i.e., 1 packet lost every 1 million packets)). Thus, the target packet delay and the target error packet loss for a corresponding QoS class of the wireless device 16-1 may also be used for the QoS target. Note that the QoS target is just one example. One or more additional or other criteria may be utilized to determine whether communication between the wireless device 16-1 and the cellular communications network 10 is possible.

If the node determines that communication between the wireless device 16-1 and the cellular communications network 10 is possible, the node decides that the wireless device 16-1 is to operate in the normal mode of operation (step 202). At that point, the node may, if needed, de-activate the one or more long range extension mechanisms with respect to the wireless device 16-1, as discussed above with respect to FIG. 2. Conversely, if the node determines that communication between the wireless device 16-1 and the cellular communications network 10 is not possible, the node decides that the wireless device 16-1 is to operate in the long range extension mode of operation (step 204). At that point, the node may activate the one or more long range extension mechanisms with respect to the wireless device 16-1, as discussed above with respect to FIG. 2. Note that the process of FIG. 3 may be performed prior to any other communication between the wireless device 16-1 and the cellular communications network 10 (e.g., a base station 14), or it may be performed when a connection between the wireless device 16-1 and a radio network node (e.g., a base station 14) in the cellular communications network 10 has already been established. For example, the wireless device 16-1 may be in an active state having an active radio link session (e.g., for LTE, RRC_CONNECTED state) or in an idle state having no active radio link session (e.g., for LTE, RRC_IDLE).

Figure 4:
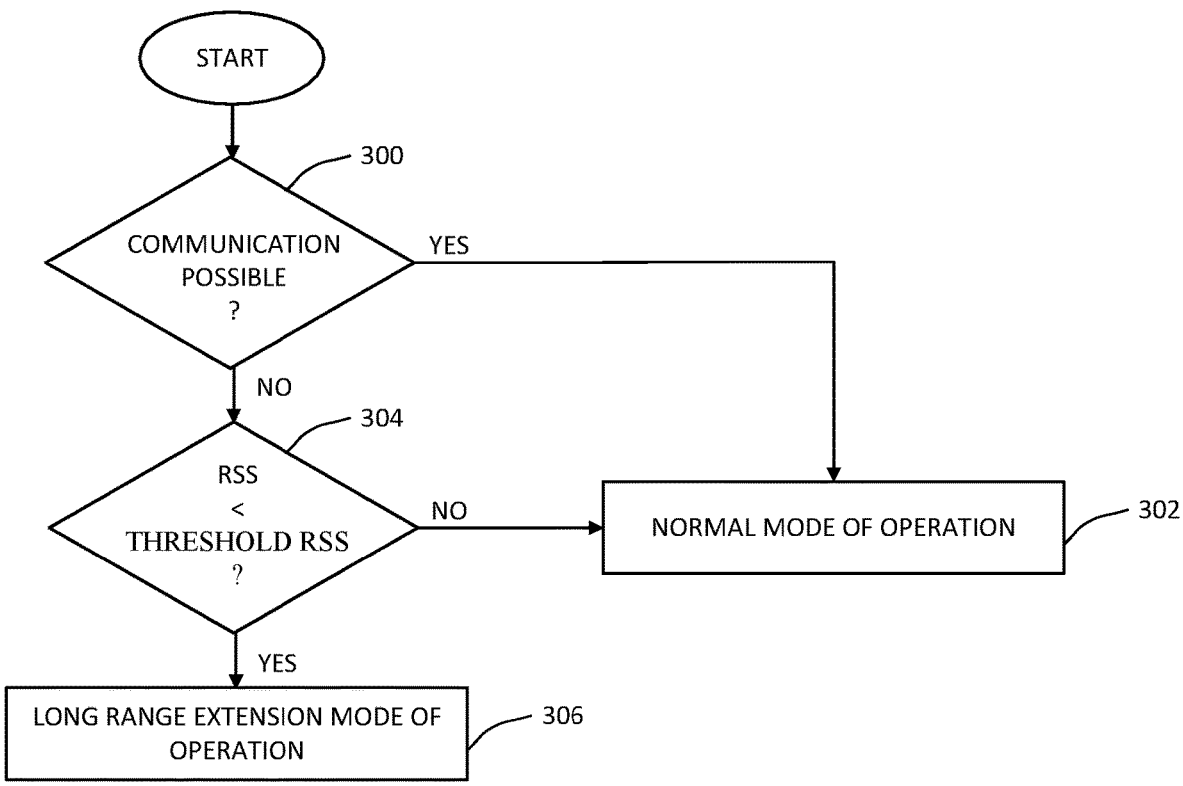
FIG. 4 illustrates a process by which a node in the cellular communications network of FIG. 1 decides whether a wireless device is to be in the long range extension mode or the normal mode according to another embodiment of the present disclosure.

FIG. 4 illustrates a process by which a node determines whether, in this example, the wireless device 16-1 is to operate in the long range extension mode or the normal mode according to another embodiment of the present disclosure. While not being limited thereto, the process of FIG. 4 may, in one embodiment, be utilized for step 100 of FIG. 2. Again, the node that performs the process of FIG. 4 may be the wireless device 16-1 or a network node (e.g., the serving base station 14 of the wireless device 16-1). This process is similar to that of FIG. 3 but where an additional check of Received Signal Strength (RSS) is additionally performed before deciding that the wireless device 16-1 is to operate in the long range extension mode.

First, the node determines whether communication between the wireless device 16-1 and the cellular communications network 10 is possible, as discussed above with respect to step 200 of FIG. 3 (step 300). If the node determines that communication between the wireless device 16-1 and the cellular communications network 10 is possible, the node decides that the wireless device 16-1 is to operate in the normal mode of operation (step 302). At that point, the node may, if needed, de-activate the one or more long range extension mechanisms with respect to the wireless device 16-1, as discussed above with respect to FIG. 2. Conversely, if the node determines that communication between the wireless device 16-1 and the cellular communications network 10 is not possible, the node determines whether measured RSS in at least one of the uplink or downlink direction is less than a predefined threshold RSS (step 304). The predefined threshold RSS may be either static or configured by the cellular communications network 10.

If the RSS is not less than the RSS threshold, then the node decides that the wireless device 16-1 is to operate in the normal mode of operation (step 302). At that point, the node may, if needed, de-activate the one or more long range extension mechanisms with respect to the wireless device 16-1, as discussed above with respect to FIG. 2. However, if the RSS is less than the RSS threshold, the node decides that the wireless device 16-1 is to operate in the long range extension mode of operation (step 306). At that point, the node may activate the one or more long range extension mechanisms with respect to the wireless device 16-1, as discussed above with respect to FIG. 2.

Figure 5:
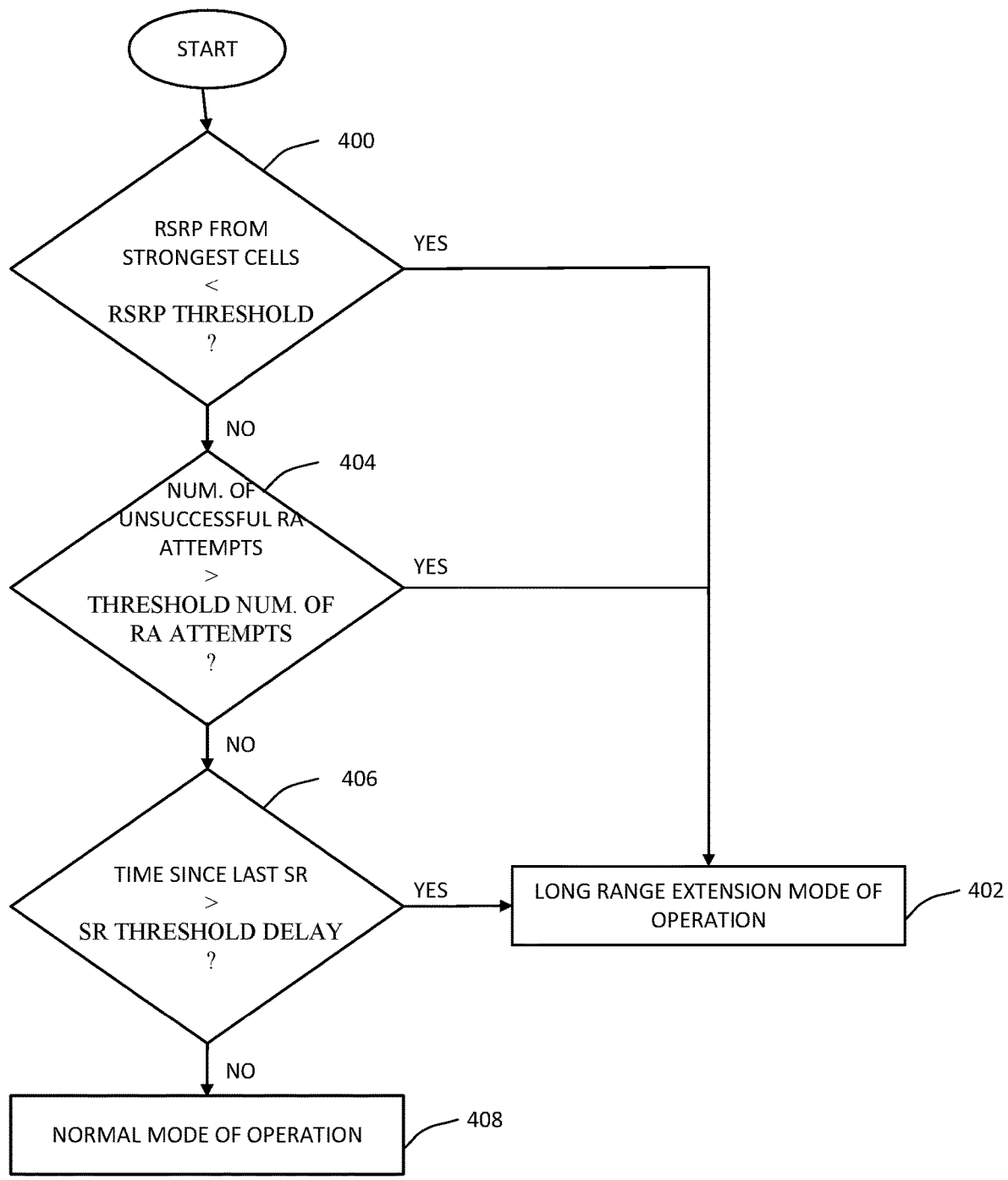
FIG. 5 illustrates a process by which a node in the cellular communications network of FIG. 1 decides whether a wireless device is to be in the long range extension mode or the normal mode according to another embodiment of the present disclosure.

FIG. 5 illustrates a process by which a node determines whether, in this example, communication between the wireless device 16-1 and the cellular communications network 10 is possible according to one embodiment of the present disclosure. While not being limited thereto, the process of FIG. 5 may, in one embodiment, be utilized for step 200 of FIG. 3 or step 300 of FIG. 4. Again, the node that performs the process of FIG. 5 may be the wireless device 16-1 or a network node (e.g., the serving base station 14 of the wireless device 16-1). Also, note that the ordering of the steps in FIG. 5 is not important. In other words, the various criteria may be checked in any desired order. Further, not all steps may be performed. Specifically, the determination of whether communication is possible, and as such whether the wireless device 16-1 is to operate in the long range extension mode, may be made based on any one or more of the criteria indicated in FIG. 5.

As illustrated, the node determines whether RSRP from a predefined (statically defined or configured by the cellular communications network 10) number, N, of strongest cells at the wireless device 16-1 are all less than a predefined (statically defined or configured by the cellular communications network 10) RSRP threshold (step 400). If so, the node determines that the wireless device 16-1 is to operate in the long range extension mode (step 402). At that point, the node activates one or more long range extension mechanisms with respect to the wireless device 16, as discussed above. Note that, with respect to the embodiment of FIG. 4, the node may further check RSS before making the decision that the wireless device 16-1 is to operate in the long range extension mode.

If measured RSRP from the predefined number, N, of strongest cells at the wireless device 16-1 are not all less than a predefined RSRP threshold, the node determines whether a number of unsuccessful Random Access (RA) attempts by the wireless device 16-1 is greater than a predefined RA attempts threshold (step 404). If so, the node determines that the wireless device 16-1 is to operate in the long range extension mode (step 402). At that point, the node activates one or more long range extension mechanisms with respect to the wireless device 16, as discussed above. Note that, with respect to the embodiment of FIG. 4, the node may further check RSS before making the decision that the wireless device 16-1 is to operate in the long range extension mode.

If the number of unsuccessful RA attempts by the wireless device 16-1 is not greater than the predefined RA attempts threshold, the node determines whether a time period elapsed since transmission of the last (current) scheduling request by the wireless device 16-1 exceeds a predefined scheduling request threshold delay (step 406). If so, the node determines that the wireless device 16 is to operate in the long range extension mode (step 402). At that point, the node activates one or more long range extension mechanisms with respect to the wireless device 16, as discussed above. Note that, with respect to the embodiment of FIG. 4, the node may further check RSS before making the decision that the wireless device 16-1 is to operate in the long range extension mode. If the time period elapsed since transmission of the last (current) scheduling request by the wireless device 16-1 does not exceed the predefined scheduling request delay threshold, the node determines that the wireless device 16 is to operate in the normal mode (step 408).

In one example, values for the RSRP threshold, N, RA attempts threshold, and scheduling request delay threshold are −120 Decibel-Milliwatt (dBm), 1, 10, and 100 ms, respectively. However, these are just examples. Other values may be used. Also, the value for the scheduling request threshold delay can be significantly higher than the value of a timer that is typically launched when a scheduling request is transmitted by the wireless device 16, which is typically in the order of 5-10 ms. Moreover, this period might correspond to more than one scheduling request.

Figure 6:
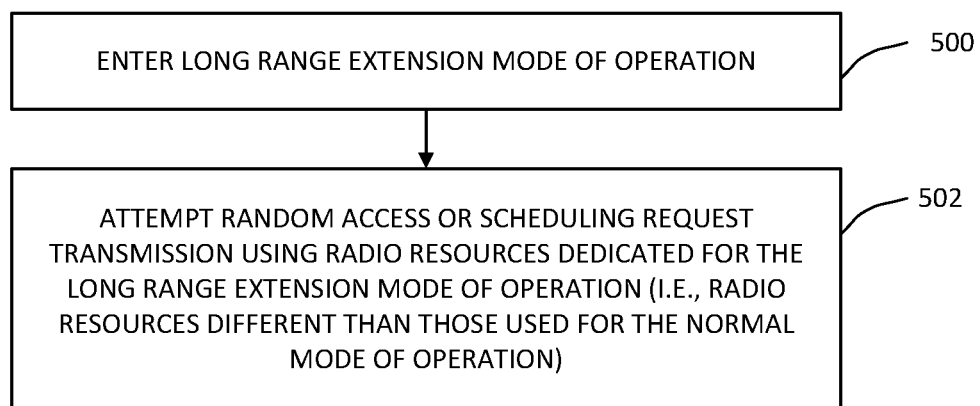
FIG. 6 illustrates a process by which a wireless device attempts random access and/or a scheduling request transmission using radio resources dedicated for the long range extension mode according to one embodiment of the present disclosure.

FIG. 6 illustrates a process by which the wireless device 16-1, upon entering the long range extension mode, attempts random access or scheduling request transmission using radio resources dedicated to the long range extension mode of operation according to one embodiment of the present disclosure. As illustrated, the wireless device 16-1 enters the long range extension mode of operation (step 500). The wireless device 16-1 may enter the long range extension mode of operation upon determining itself that the wireless device 16-1 is to operate in the long range extension mode using one of the processes of FIGS. 2 through 5 or by receiving instructions to enter the long range extension mode from the cellular communications network 10 (e.g., from the serving base station 14 of the wireless device 16-1). Upon entering the long range extension mode, at the next occasion of accessing the cellular communications network 10, the wireless device 16-1 attempts random access and/or scheduling request transmission (e.g., an uplink scheduling request) using specific radio resources (i.e., time and/or frequency resources such as physical resource blocks and/or time slots) dedicated for the long range extension mode (step 502). The radio resources dedicated for random access or scheduling request transmissions for the long range extension mode are different than radio resources used for random access and scheduling request transmissions in the normal mode.

Figure 7:
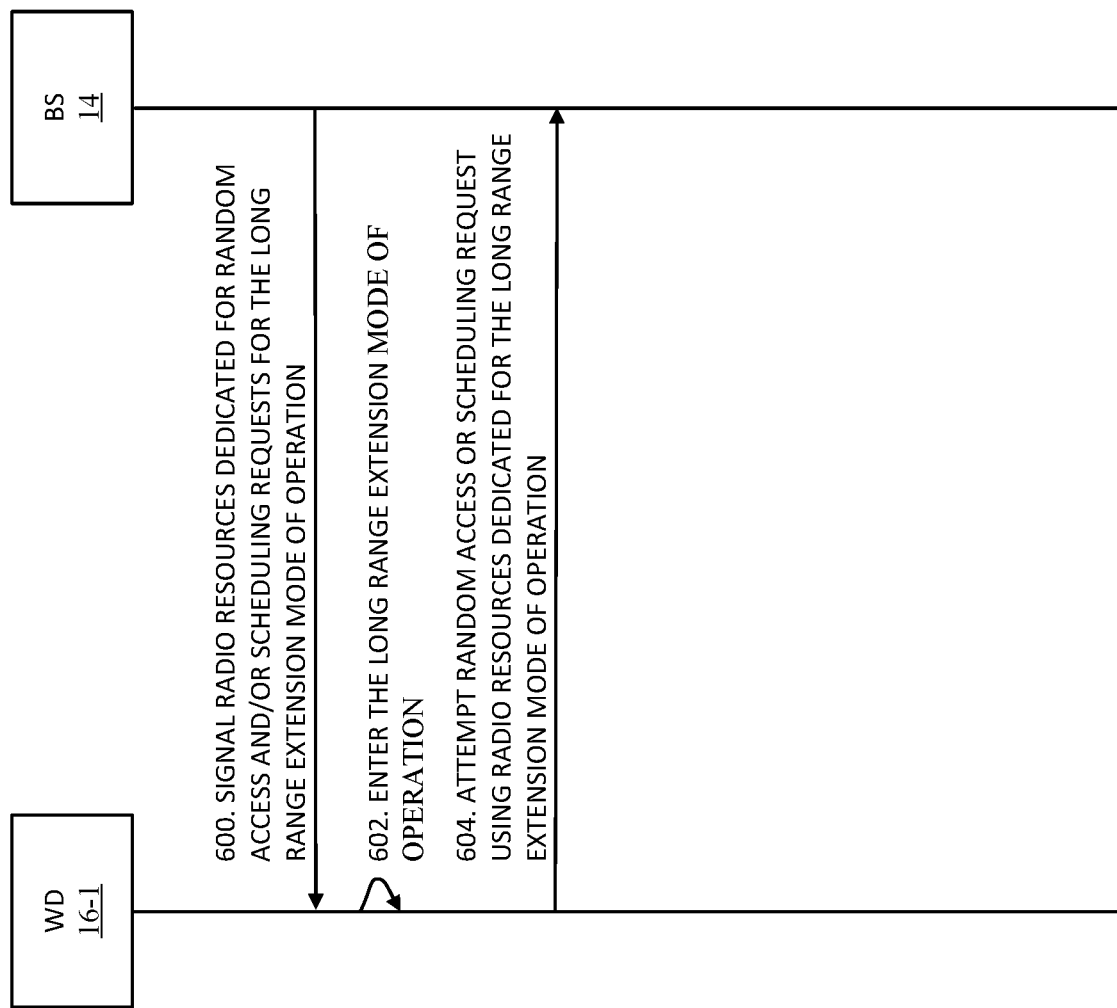
FIG. 7 illustrates the operation of the cellular communications network of FIG. 1 according to one embodiment in which the base station signals radio resources to the wireless device that are dedicated for random access and/or scheduling request transmissions for the long range extension mode of operation.

FIG. 7 illustrates a process that is similar to that of FIG. 6 but where the cellular communications network 10 signals the radio resources for random access attempts and signal request transmissions to the wireless device 16-1 according to one embodiment of the present disclosure. As illustrated, a base station 14 (i.e., the serving base station 14) of the wireless device 16-1 signals the radio resources (or more specifically information indicative of the radio resources) dedicated for random access and/or scheduling requests for the long range extension mode to the wireless device 16-1 (step 600). The signaling may be, for example, broadcast signaling to all or essentially all wireless devices 16 in a cell, broadcast signaling intended only for wireless devices 16 operating or to be operating in the long range extension mode, dedicated signaling to any wireless device 16, or dedicated signaling specifically for the wireless devices 16-1 when operating in the long range extension mode. Alternatively, the radio resources dedicated for random access and/or scheduling requests for the long range extension mode may be statically defined (e.g., standardized) or provided to the wireless device 16-1 with subscription information. Note that the subscription information may be obtained by the wireless device 16-1 when the wireless device 16-1 is connected for the first time or when the wireless device 16-1 is installed for the first time in the cell. Alternatively, the subscription information may be stored at the wireless device 16-1. At some point in time, the wireless device 16-1 enters the long range extension mode (step 602). The wireless device 16-1 then attempts RA or scheduling request transmission using the radio resources signaled in step 600 (step 604).

Figure 8:
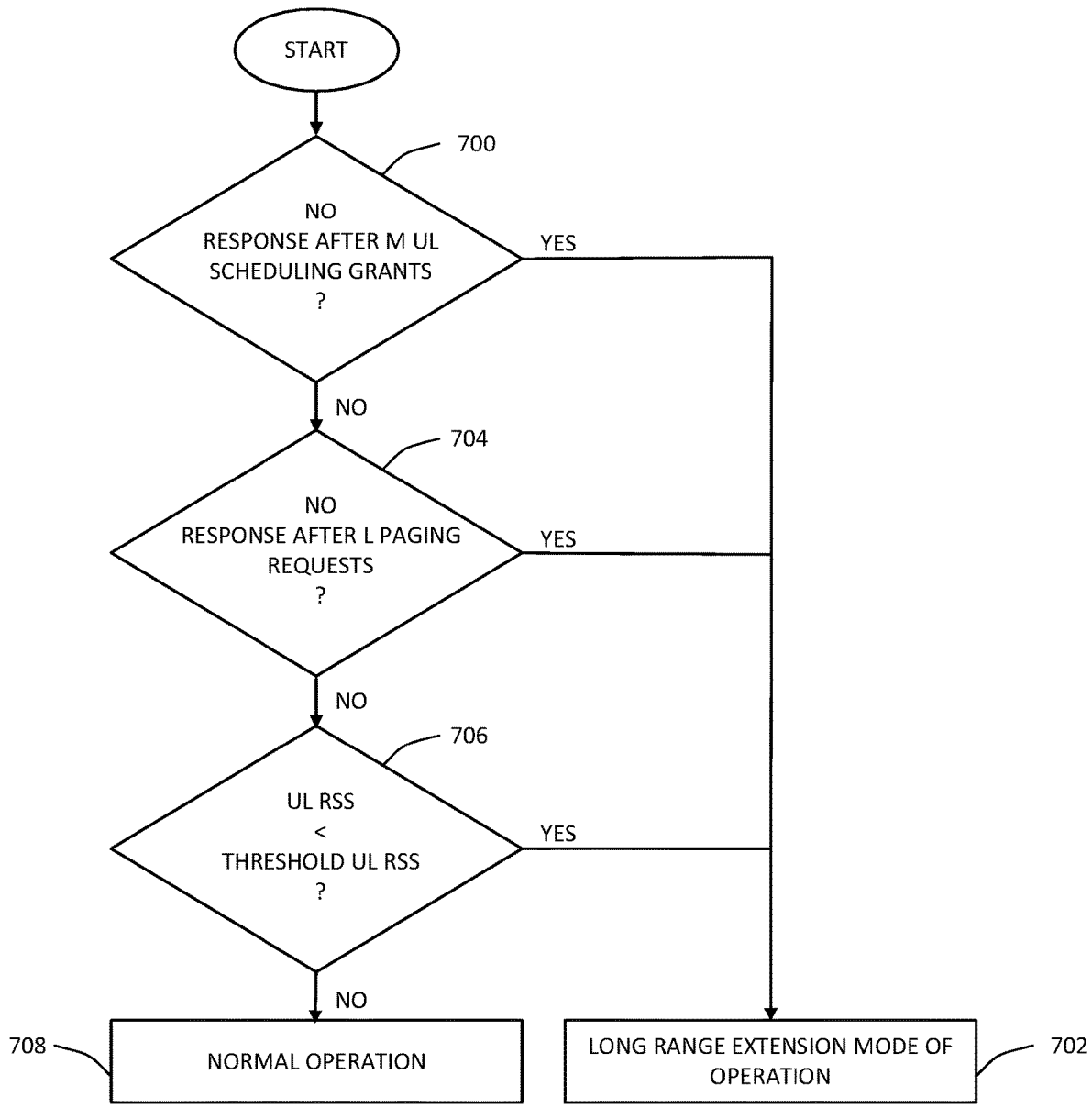
FIG. 8 illustrates a process by which a network node (e.g., a base station) in the cellular communications network of FIG. 1 decides whether a wireless device is to be in the long range extension mode or the normal mode according to another embodiment of the present disclosure.

FIG. 8 illustrates a process by which a network node determines whether the wireless device 16-1 is to operate in the long range extension mode or the normal mode according to one embodiment of the present disclosure. This process is particularly well-suited for a network node and even more particularly well-suited for a radio access node (e.g., the serving base station 14 of the wireless device 16-1). This process may be utilized in, for example, step 100 of FIG. 2 or step 200 of FIG. 3. Note that the ordering of the steps in FIG. 8 is not important. In other words, the various criteria may be checked in any desired order. Further, not all steps may be performed. Specifically, the determination of whether the wireless device 16-1 is to operate in the long range extension mode may be made based on any one or more of the criteria indicated in FIG. 8.

As illustrated, the network node determines whether no response has been received from the wireless device 16-1 after a number, M, of uplink scheduling grants transmitted to the wireless device 16-1 (step 700). If so, the network node determines that the wireless device 16-1 is to operate in the long range extension mode (step 702). At that point, the one or more long range extension mechanisms are activated with respect to the wireless device 16-1, as discussed above. Otherwise, the network node determines whether no response has been received from the wireless device 16-1 after a number, L, of paging requests for the wireless device 16-1 (step 704). If so, the node determines that the wireless device 16-1 is to operate in the long range extension mode (step 702). At that point, the one or more long range extension mechanisms are activated with respect to the wireless device 16-1, as discussed above. Otherwise, the network node determines whether an RSS for any transmitted message, either data, uplink pilots, or uplink L1 signaling (e.g., Physical Uplink Control Channel (PUCCH)), transmitted in the uplink from the wireless device 16-1 is below a predefined uplink RSS threshold (step 706). If so, the network node determines that the wireless device 16-1 is to operate in the long range extension mode (step 702). At that point, the one or more long range extension mechanisms are activated with respect to the wireless device 16-1, as discussed above. Otherwise, the network node determines that the wireless device 16-1 is to operate in the normal mode (step 708). As an example, the values of M, L, and the uplink RSS threshold are 10, 10, and −120 dBm, respectively. Note that, in one embodiment, the network node permanently or continuously performs the process of FIG. 8.

Figure 9:
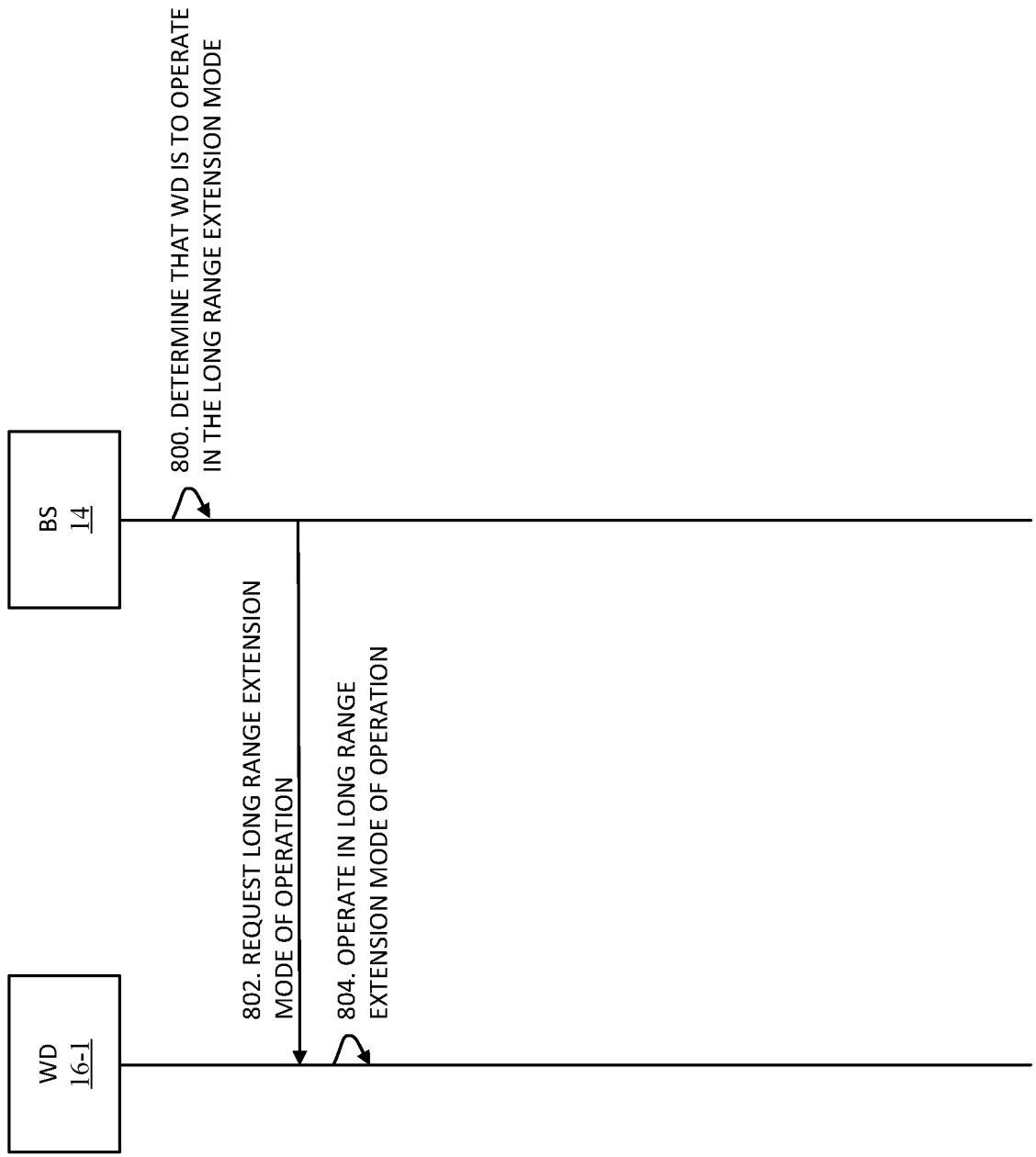
FIG. 9 illustrates the operation of the cellular communications network of FIG. 1 according to one embodiment in which the base station sends a request to the wireless device to operate in the long range extension mode of operation.

FIG. 9 illustrates the operation of a base station 14 to determine that the wireless device 16-1 is to operate in the long range extension mode and then request, or command, the wireless device 16-1 to do so according to one embodiment of the present disclosure. As illustrated, the base station 14 determines that the wireless device 16-1 is to operate in the long range extension mode (step 800). In one embodiment, the base station 14 utilizes the process of FIG. 8 to make the determination in step 800. The base station 14 then sends a request to the wireless device 16-1 for the wireless device 16-1 to operate in the long range extension mode (step 802). It is noted here that considering that the base station 14 is aware of the need to use appropriate long range extension mode techniques when communicating with the wireless device 16-1, then this signaling of step 802 is done by using these specific techniques, such as e.g. repetitions, etc. In one embodiment, the request is a Radio Resource Control (RRC) message that, in some embodiments, includes value(s) for one or parameters to be used by the wireless device 16-1 when operating in the long range extension mode. The value(s) may include values for one or more parameters utilized for long range extension mechanisms (e.g., values indicative of uplink and/or downlink resources to be used for a specific operation, a value indicative of a PUCCH format in terms of modulation and coding, values indicative of modulation and coding scheme(s) to be used, maximum number of downlink and/or uplink repetitions to be applied, etc.), values indicative of radio resources dedicated for random access and/or scheduling requests in the long range extension mode of operation, values for Radio Link Monitoring (RLM) and/or Radio Link Failure (RLF) and recovery, or the like. In one embodiment, the value(s) in the RRC message may include a value that represents one of several different levels of extended coverage to be used for the long range extension mode. This value may then be further associated with one or more values for one or more parameters for the long range extension mode of operation. The mapping between each level of extended coverage and the value(s) for the parameter(s) for the long range extension mode of operation for that level of extended coverage may be statically defined (e.g., standardized) or included in other RRC messages.

The request (e.g., a DL RRC message) is transmitted in such a way that it can be received by the wireless devices 16 requiring the extended coverage. For example, the same DL RRC message may be repeated a sufficient number of times to allow for energy combining of subsequent repetitions in the wireless device 16-1. Such signaling may be transmitted using, for example, a dedicated signaling radio bearer using a wireless device specific communication link or a broadcast channel designed for extended coverage. In response to the request, the wireless device 16-1 then operates in the long range extension mode (step 804).

Figure 10:
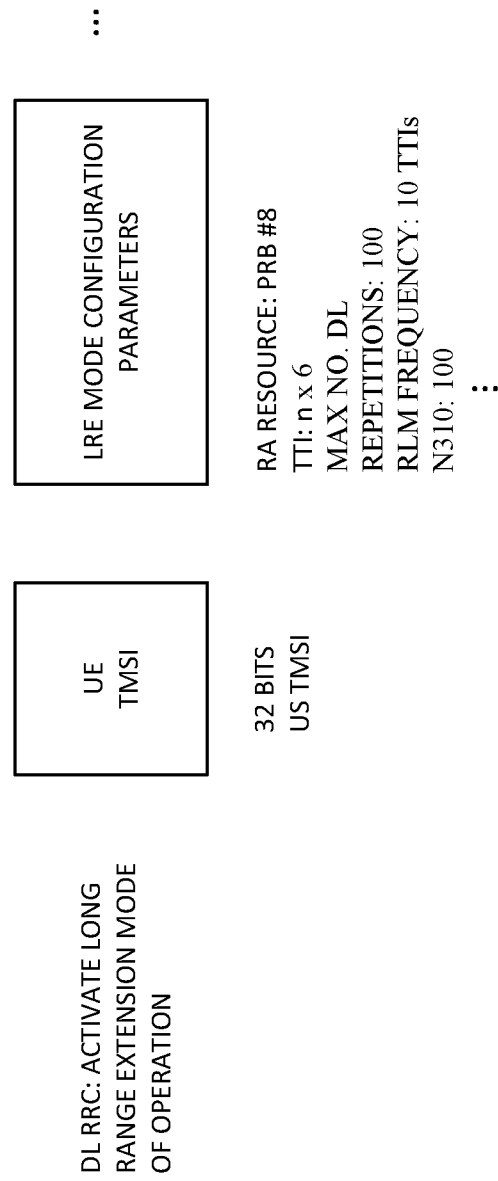
FIG. 10 illustrates one example of a Radio Resource Control (RRC) message that can be utilized by the base station of FIG. 9 to send the request to the wireless device to operate in the long range extension mode of operation according to one embodiment of the present disclosure.

FIG. 10 illustrates one example of an RRC message that can be utilized as the request in step 802 of FIG. 9 according to one embodiment of the present disclosure. As illustrated, the RRC message includes an Information Element (IE) that includes values for a number of parameters to be used by the wireless device 16-1 when operating in the long range extension mode. In this example, the RRC message includes a value that is indicative of a radio resource to be used by the wireless device 16-1 for random access attempts when operating in the long range extension mode (RA Resource: PRB #8), TTI: n×6 (i.e., every $6^{th}$ TTI should be used for random access), a maximum number of downlink repetitions (Max No. DL Repetitions: 100), an RLM frequency (i.e., frequency with which the wireless device 16-1 monitors the quality of the radio link) (RLM Frequency: 10 Transmission Time Intervals (TTIs)), a value for a counter N310 (N310: 100), etc. Note, however, that the values and parameters shown in FIG. 10 are only examples.

Figure 11:
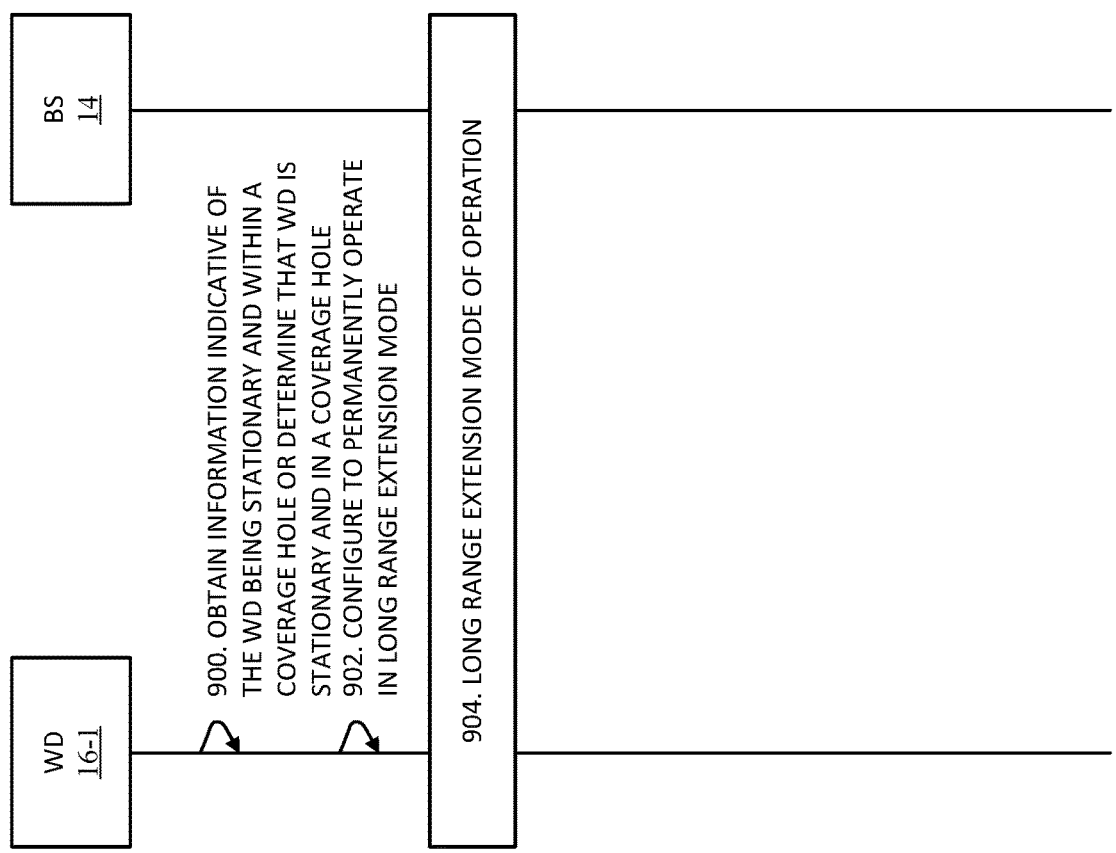
FIG. 11 illustrates the operation of a stationary wireless device to permanently operate in the long range extension mode of operation according to one embodiment of the present disclosure.

In some embodiments, some of the wireless devices 16 may be stationary devices (e.g., a stationary MTC device). Further, these stationary devices may be in locations that are within known "coverage holes" that are determined via, for example, driving tests. In one embodiment, wireless devices 16 that are both stationary and located within known coverage holes always operate in the long range extension mode. In this regard, FIG. 11 illustrates operation of the cellular communications network 10 in which the wireless device 16-1 is both stationary and located within a coverage hole and, as a result, permanently, or always, operates in the long range extension mode according to one embodiment of the present disclosure.

As illustrated, the wireless device 16-1 either obtains information that is indicative of the wireless device 16-1 being stationary and located within a known coverage hole or determines that the wireless device 16-1 is both stationary and located within a coverage hole (a known or previously unknown coverage hole) (step 900). The wireless device 16-1 may be pre-configured to know that it is stationary or may determine that it is stationary by, for example, monitoring its location or short term averages of received signal power as is characterized by link quality information. The wireless device 16-1 may use any suitable technique for determining its location (e.g., a Global Positioning System (GPS) receiver, assistance from other wireless devices 16, or the like). Further, low mobility (e.g., being stationary) can be based on low variability of short term averages of the received signal power as is characterized by link quality information for the wireless device 16-1 (e.g., RSRP, RSRQ, and/or SINR values). Other parameters may be used to detect that the wireless device 16 is stationary (or has low mobility) such as, for example, velocity, Doppler shift, etc. Information that identifies known coverage hole(s) may be communicated to the wireless device 16-1 from the cellular communications network 10. Alternatively, the wireless device 16-1 may determine that it is located in a coverage hole based on, for example, any of the parameters discussed above for determining when communication between the wireless device 16-1 and the cellular communications network 10 is not possible.

Once the wireless device 16-1 knows that it is stationary (or has sufficiently low mobility) and located in a coverage hole, the wireless device 16-1 configures itself to permanently operate in the long range extension mode (step 902). More specifically, the wireless device 16-1 configures itself to use one or more long range extension mechanisms, radio resources dedicated to the long range extension mode, etc., as discussed above. The wireless device 16-1 then communicates with the base station 14 in the long range extension mode (step 904).

Figure 12:
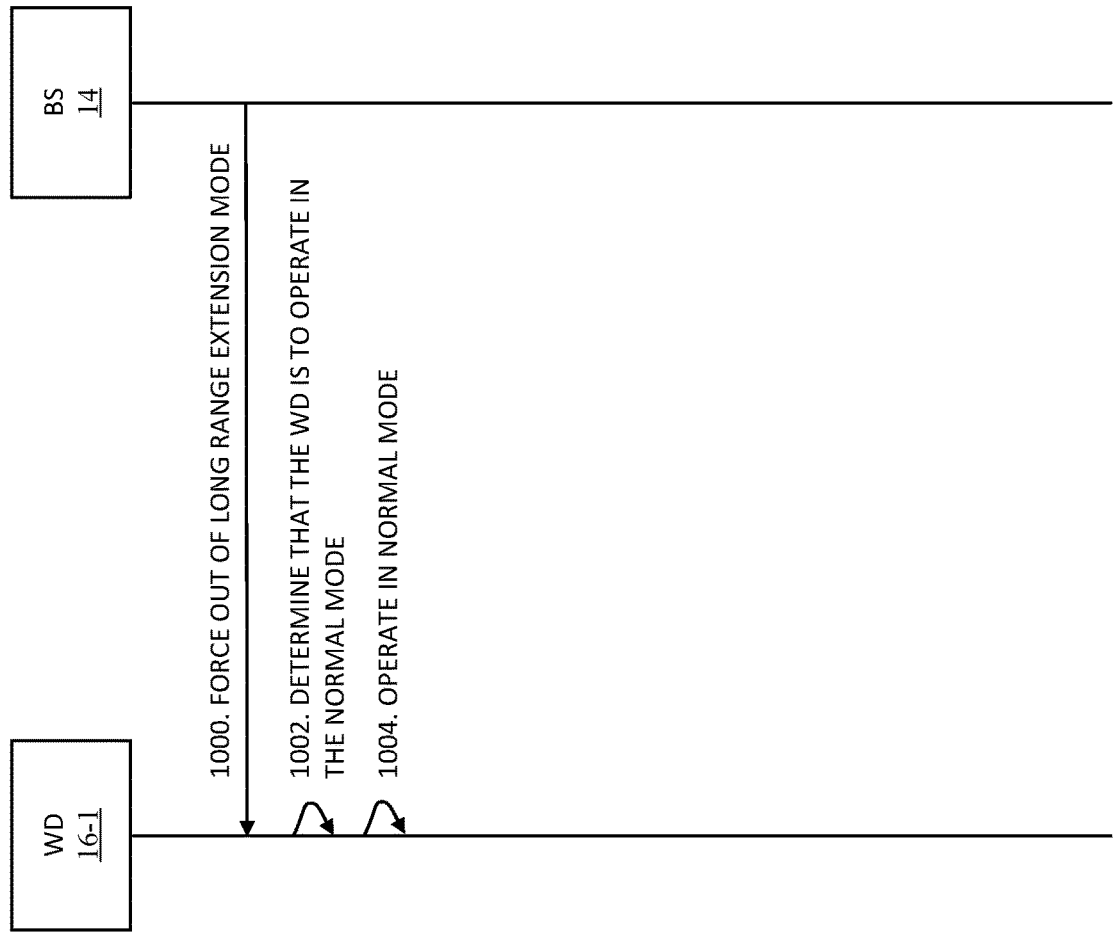
FIG. 12 illustrates the operation of a base station to force a wireless device out of the long range extension mode of operation according to one embodiment of the present disclosure.

FIG. 12 illustrates a process by which the cellular communications network 10 forces the wireless device 16-1 out of the long range extension mode according to one embodiment of the present disclosure. Forcing the wireless device 16-1 out of the long range extension mode of operation may be desirable when, for example, the cellular communications network 10 does not allow long range extension mode of operation or the cellular communications network 10 has determined that admitting the wireless device 16-1 to enter into the long range extension mode would impact system capacity. This can be configured, for example, during certain times of the day when traffic on the system is high. As illustrated, the base station 14 sends a message to the wireless device 16-1 to force the wireless device 16-1 out of the long range extension mode of operation (step 1000). Note that, rather than sending the message in step 1000, the cellular communications network 10 may perform other actions that force the wireless device 16-1 out of the long range extension mode of operation. Such actions include, but are not limited to, ceasing with providing signals and/or repetition of signals that are necessary for operation in the long range extension mode. In response, the wireless device 16-1 determines that it is to operate in the normal mode (step 1002) and therefore operates in the normal mode, as described above (step 1004).

Figure 13:
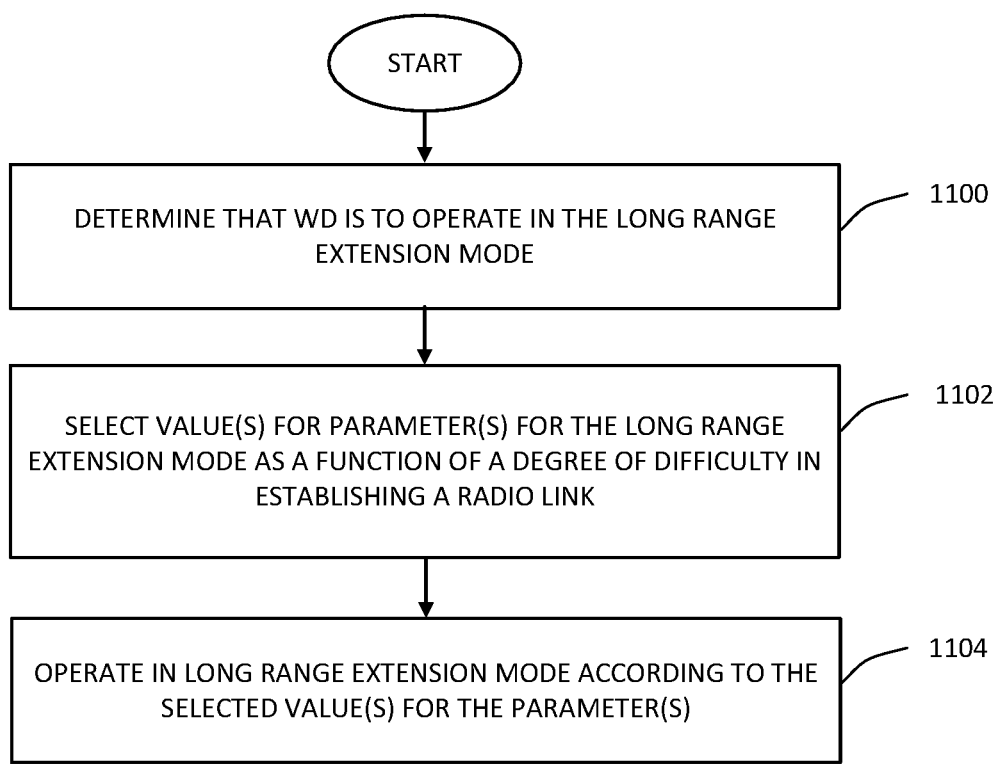
FIG. 13 illustrates a process by which a node selects value(s) for one or more parameter(s) for the long range extension mode of operation according to one embodiment of the present disclosure.

FIG. 13 illustrates a process by which, in this example, the wireless device 16-1 selects value(s) for parameter(s) for the long range extension mode of operation based on a degree of difficulty in establishing communication between the wireless device 16-1 and the cellular communications network 10 according to one embodiment of the present disclosure. As illustrated, the wireless device 16-1 determines that the wireless device 16-1 is to operate in the long range extension mode using, for example, any of the processes described above (step 1100). The wireless device 16-1 then selects value(s) for one or more parameters for the long range extension mode as a function of a degree of difficulty in establishing a radio link (i.e., communication) between the wireless device 16-1 and a radio network node (e.g., a base station 14) in the cellular communications network 10 (step 1102). As non-limiting examples, the degree of difficulty in establishing a radio link may be measured in terms of one or more of: the RSS from a serving cell measured by the wireless device 16-1; the ability of the wireless device 16-1 to detect a cell based on a synchronization signal with a specific probability of successful detection; the ability of the wireless device 16-1 to receive broadcast information, e.g., a Master Information Block (MIB) and a System Information Block 1 (SIB1); and the number of random access attempts, or the type of random access procedure used, when the wireless device 16-1 successfully connects to the cellular communications network 10.

Based on the degree of difficulty in establishing the radio link, the wireless device 16-1 may then select, for example, values for one or more parameters to be used in the long range extension mode, e.g., values for one or more parameters to be used or proposed to be used in one or more long range extension mechanisms such as, for example, increased transmit power, increased amount of reference signal resources, decreased code rate, and increased number of repetitions to be used in data transmissions. These parameter values may apply both to uplink and downlink transmissions, possibly with different values for each direction. Parameter values to be applied in the wireless device 16-1 can be done so autonomously by the wireless device 16-1, whereas parameter values to be used or proposed to be used by the network node may be signaled to the cellular communications network 10, e.g., in an RRC message. Some of the parameters further may refer to transmitter settings, other parameters may refer to receiver settings, and yet other parameters may refer to both transmitter and receiver settings. The wireless device 16-1 then operates in the long range extension mode in accordance with the value(s) selected for the parameter(s) in step 1102 (step 1104).

FIG. 14 illustrates a process that is similar to that of FIG. 13 but where a network node, which in this example is a base station 14, selects value(s) for parameter(s) for the long range extension mode according to another embodiment of the present disclosure. As illustrated, the base station 14 determines that the wireless device 16-1 is to operate in the long range extension mode using, for example, any of the processes described above (step 1200). The base station 14 then selects value(s) for one or more parameters for the long range extension mode as a function of a degree of difficulty in establishing a radio link (i.e., communication) between the wireless device 16-1 and a radio network node (e.g., a base station 14) in the cellular communications network 10 (step 1202). As non-limiting examples, the degree of difficulty in establishing a radio link may be measured in terms of one or more of: the RSS from a serving cell (e.g., the cell of the base station 14) measured by the wireless device 16-1; the RSS from the wireless device 16-1 measured by the base station 14; the ability of the wireless device 16-1 to detect a cell based on a synchronization signal with a specific probability of successful detection; the ability of the wireless device 16-1 to receive broadcast information, e.g., the MIB and the SIB1; and the number of random access attempts, or the type of random access procedure used, when the wireless device 16-1 successfully connects to the cellular communications network 10.

Based on the degree of difficulty in establishing the radio link, the base station 14 may then select, for example, values for one or more parameters to be used or proposed to be used in the long range extension mode, e.g., values for one or more parameters to be used in one or more long range extension mechanisms such as, for example, increased transmit power, increased amount of reference signal resources, decreased code rate, and increased number of repetitions to be used in data transmissions. These parameter values may apply both to uplink and downlink transmissions, possibly with different values for each direction. Some of the parameters further may refer to transmitter settings, other parameters may refer to receiver settings, and yet other parameters may refer to both transmitter and receiver settings. The base station 14 then sends a request to the wireless device 16-1 to operate in the long range extension mode (step 1204). In some embodiments, the request includes some or all of the value(s) selected by the base station 14 for the parameter(s) for the long range extension mode of operation. Notably, the selected values may include selected values to be applied at the base station 14 (e.g., for parameters for long range extension mode mechanisms executed by the base station 14), selected values to be applied at the wireless device 16-1 (e.g., for parameters for long range extension mode mechanisms executed by the wireless device 16-1), and/or selected values to be applied at the wireless device 16-1 (e.g., for parameters for long range extension mode mechanisms executed by the wireless device 16-1). In response to the request, the wireless device 16-1 then operates in the long range extension mode in accordance with the value(s) selected for the parameter(s) in step 1202 (step 1206).

FIG. 15 is a block diagram illustrating a node 20 configured to operate according to one or more of the embodiments disclosed herein. The node 20 is specifically a wireless node, e.g., one of the wireless devices 16 or a radio network node such as, for example, one of the base stations 14. As illustrated, the node 20 comprises a wireless interface 22 (e.g., transceiver circuits) and one or more control and processing circuits 24. Where the node 20 comprises a radio network node such as a base station 14, the node 20 may further include one or more other communication interfaces 26 (e.g., for interfacing with other network nodes). Where the node 20 comprises a wireless device 16, the node 20 may further comprise a sensor 28 to report data indicating, for example, a temperature, wind speed, or humidity.

The wireless interface 22 may include various radio frequency components to receive and process radio signals from one or more other wireless nodes (e.g., wireless devices 16 and/or base stations 14 depending on the embodiment), using known signal processing techniques. The one or more control and processing circuits 24 may comprise one or more microprocessors, digital signal processors, and the like. The one or more control and processing circuits 24 may also comprise other digital hardware and a memory (e.g., Read Only Memory (ROM), Random Access Memory (RAM), cache, flash, etc.) that stores program code for executing one or more communications protocols and for carrying out one or more of the techniques above. Regardless, the one or more control and processing circuits 24 are configured such that the node 20 operates according to one or more of the previously described embodiments. As shown, for instance, the one or more control and processing circuits 24 may include one or more control/signaling circuits 30 configured to carry out some or all of the steps of one or more of the processes disclosed herein.

In any of the previously described embodiments, the decision of whether to communicate, or operate, in the normal mode or the long range extension mode may be re-evaluated on a regular or periodic basis. As one example, an indication that triggers re-evaluating the decision of whether to operate in the normal mode or the long range extension mode may be detection of mobility of the wireless device 16 either at a network node or at the wireless device 16.

As those of ordinary skill in the art should appreciate, the features of the above-mentioned embodiments may be used separately, or combined in multiple ways. For example, it is possible that one embodiment is executed in the wireless device 16, and another embodiment is simultaneously executed in a network node.

The concepts disclosed herein may be carried out in other ways than those specifically set forth herein without departing from essential characteristics of the disclosure. Therefore, the embodiments disclosed herein are to be considered in all respects as illustrative and not restrictive, and all changes coming within the meaning and equivalency range of the appended claims are intended to be embraced therein.

Some implementations of the embodiments of the present disclosure provide advantages and benefits that conventional systems cannot provide. However, the embodiments disclosed herein are not limited to any particular advantage. As one example, embodiments disclosed herein enable the operation of wireless devices 16 in extended long range conditions compared to existing wireless systems by providing systems and methods for changing between normal operation and extended long range operation. As a result, the minimization of signaling overhead and the minimization of energy consumption within these wireless devices 16 is achieved.

The following acronyms are used throughout this disclosure.
3GPP $3^{rd}$ Generation Partnership Project
ASIC Application Specific Integrated Circuit
BER Bit Error Rate
BLER Block Error Rate
dB Decibel
dBm Decibel-Milliwatt
CQI Channel Quality Indication
D2D Device-to-Device
DL Downlink
EGPRS Enhanced General Packet Radio Service
eNB Evolved Node B
FDD Frequency Division Duplexing
GPRS General Packet Radio Service
GPS Global Positioning System
GSM Global System for Mobile Communications
ID Identifier
IE Information Element
IP Internet Protocol
Kbps Kilobits per Second
LTE Long Term Evolution
M2M Machine-to-Machine
MIB Master Information Block
MME Mobility Management Entity
ms Millisecond
MTC Machine Type Communication
PSS Primary Synchronization Signal
PUCCH Physical Uplink Control Channel
QoS Quality of Service
RA Random Access
RAM Random Access Memory
RAN Radio Access Network
RLF Radio Link Failure
RLM Radio Link Monitoring
ROM Read Only Memory
RRC Radio Resource Control
RSRP Reference Signal Received Power
RSRQ Reference Signal Received Quality
RSS Received Signal Strength
SAE System Architecture Evolution
SIB System Information Block
SID Study Item Description
SINR Signal-to-Interference-Plus-Noise Ratio
SSS Secondary Synchronization Signal
TDD Time Division Duplexing
TR Technical Report
TS Technical Specification
TTI Transmission Time Interval
UE User Equipment
UL Uplink Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless device in a cellular communications network, comprising:
    determining that the wireless device is to operate in a long range extension mode of operation in the cellular communications network when Reference Signal Received Power, RSRP, measured by the wireless device is less than a predefined threshold RSRP, the long range extension mode of operation being a mode of operation of the wireless device in which the wireless device is configured to maintain communication with the same cellular communications network over an extended range as compared to a normal range over which the wireless device is enabled to maintain communication with the cellular communications network when operating in a normal mode of operation; and if the wireless device is to operate in the long range extension mode of operation, activating one or more long range extension mechanisms such that the wireless device operates in the long range extension mode of operation in the same cellular communications network;

where there is difficulty in establishing communication between the wireless device and the cellular communications network including at least one of the group consisting of: difficulty in establishing an uplink from the wireless device to the cellular communications network; and difficulty in establishing a downlink from the cellular communications network to the wireless device.

2. The method of claim 1 wherein the one or more long range extension mechanisms comprise at least one of the group consisting of: use of an increased transmit power that eases the difficulty in establishing communication between the wireless device and the cellular communications network, use of an increased amount of reference signal resources that ease the difficulty in establishing communication between the wireless device and the cellular communications network, use of one or more modified repetition schemes that ease the difficulty in establishing communication between the wireless device and the cellular communications network, use of one or more scheduling restrictions that ease the difficulty in establishing communication between the wireless device and the cellular communications network, use of one or more modulation and coding schemes that ease the difficulty in establishing communication between the wireless device and the cellular communications network, use of one or more synchronization signals that ease the difficulty in establishing communication between the wireless device and the cellular communications network, and use of random access resources that ease the difficulty in establishing communication between the wireless device and the cellular communications network.

3. The method of claim 1 wherein the method further comprises, if the wireless device is to operate in the long range extension mode of operation, attempting a random access using one or more resources dedicated for the long range extension mode of operation.

4. The method of claim 1 wherein the method further comprises, if the wireless device is to operate in the long range extension mode of operation, attempting a scheduling request transmission using one or more resources dedicated for the long range extension mode of operation.

5. The method of claim 1 wherein:
the method further comprises receiving information that is indicative of one or more radio resources dedicated for random access attempts in the long range extension mode of operation; and wherein
activating the one or more long range extension mechanisms comprises activating use of the one or more radio resources dedicated for random access attempts in the long range extension mode of operation.

6. The method of claim 1 wherein:
the method further comprises receiving information that is indicative of one of one or more radio resources dedicated for uplink scheduling requests in the long range extension mode of operation; and wherein
activating the one or more long range extension mechanisms comprises activating use of the one or more radio resources dedicated for the uplink scheduling requests in the long range extension mode of operation.

7. The method of claim 1 further comprising selecting one or more parameters for the long range extension mode of operation as a function of a difficulty level in establishing communication between the cellular communications network and the wireless device.

8. The method according to claim 1, wherein the RSRP measured by the wireless device is a RSRP measurement for a serving network node of the cellular communications network.

9. The method according to claim 1, wherein the predefined RSRP threshold is configured by a network node in the cellular communications network.

10. A wireless device for use in a cellular communications network, comprising:
a wireless interface; and
one or more control and processing circuits associated with the wireless interface and configured to:
determine that the wireless device is to operate in a long range extension mode of operation in the cellular communications network when Reference Signal Received Power, RSRP, measured by the wireless device is less than a predefined threshold RSRP, the long range extension mode of operation being a mode of operation of the wireless device in which the wireless device is configured to maintain communication with the same cellular communications network over an extended range as compared to a normal range over which the wireless device is enabled to maintain communication with the cellular communications network when operating in a normal mode of operation; and
if the wireless device is to operate in the long range extension mode of operation, activate one or more long range extension mechanisms such that the wireless device operates in the long range extension mode of operation in the same cellular communications network;
where there is difficulty in establishing communication between the wireless device and the cellular communications network including at least one of the group consisting of: difficulty in establishing an uplink from the wireless device to the cellular communications network; and difficulty in establishing a downlink from the cellular communications network to the wireless device.

11. A method of operation of a network node in a cellular communications network, comprising:
configuring a wireless device with a predefined threshold Reference Signal Received Power, RSRP, associated with a long range extension mode of operation in the cellular communications network, wherein the wireless device is to operate in the long range extension mode of operation if RSRP measured by the wireless device is less than the predefined threshold RSRP, the long range extension mode of operation being a mode of operation of the wireless device in which the wireless device is configured to maintain communication with the same cellular communications network over an extended range as compared to a normal range over which the wireless device is enabled to maintain communication with the cellular communications network when operating in a normal mode of operation; and signaling information to the wireless device that is indicative of one or more long range extension mechanisms to be activated when the wireless device is in the long range extension mode where there is difficulty in establishing communication between the wireless device and the cellular communications network including at least one of the group consisting of: difficulty in establishing an uplink from the wireless device to the cellular communications network; and difficulty in establishing a downlink from the cellular communications network to the wireless device.

12. The method according to claim 11, wherein the information that is indicative of one or more long range extension mechanisms to be activated when the wireless device is in the long range extension mode comprises one or more radio resources dedicated for random access attempts in the long range extension mode of operation.

13. A network node for use in a cellular communications network, comprising:

a wireless interface; and one or more control and processing circuits associated with the wireless interface and configured to:

configure a wireless device with a predefined threshold Reference Signal Received Power, RSRP, associated with a long range extension mode of operation in the cellular communications network, wherein the wireless device is to operate in the long range extension mode of operation if RSRP measured by the wireless device is less than the predefined threshold RSRP, the long range extension mode of operation being a mode of operation of the wireless device in which the wireless device is configured to maintain communication with the same cellular communications network over an extended range as compared to a normal range over which the wireless device is enabled to maintain communication with the cellular communications network when operating in a normal mode of operation; and signal information to the wireless device that is indicative of one or more long range extension mechanisms to be activated when the wireless device is in the long range extension mode where there is difficulty in establishing communication between the wireless device and the cellular communications network including at least one of the group consisting of: difficulty in establishing an uplink from the wireless device to the cellular communications network; and difficulty in establishing a downlink from the cellular communications network to the wireless device.

* * * * *

UNITED STATES PATENT AND TRADEMARK OFFICE
CERTIFICATE OF CORRECTION

PATENT NO. : 10,757,565 B2  
APPLICATION NO. : 16/104552  
DATED : August 25, 2020  
INVENTOR(S) : Balachandran et al.

Page 1 of 1

It is certified that error appears in the above-identified patent and that said Letters Patent is hereby corrected as shown below:

In the Specification

In Column 9, Line 49, delete "difficultly" and insert -- difficulty --, therefor.

In Column 10, Line 56, delete "Sequence Signal (PSS)," and insert -- Signal (PSS), --, therefor.

In Column 10, Line 57, delete "Sequence Signal (SSS)," and insert -- Signal (SSS), --, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*